(12) United States Patent
Fujisawa et al.

(10) Patent No.: US 9,771,517 B2
(45) Date of Patent: *Sep. 26, 2017

(54) LIQUID-CRYSTAL OPTICAL MODULATION ELEMENT

(71) Applicant: DIC CORPORATION, Tokyo (JP)

(72) Inventors: Toru Fujisawa, Kita-adachi-gun (JP); Kazuaki Hatsusaka, Kita-adachi-gun (JP); Kazunori Maruyama, Kita-adachi-gun (JP); Isa Nishiyama, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/405,658

(22) PCT Filed: Jun. 5, 2013

(86) PCT No.: PCT/JP2013/065623
§ 371 (c)(1),
(2) Date: Apr. 7, 2015

(87) PCT Pub. No.: WO2013/183684
PCT Pub. Date: Dec. 12, 2013

(65) Prior Publication Data
US 2016/0017226 A1    Jan. 21, 2016

(30) Foreign Application Priority Data
Jun. 6, 2012 (JP) .................................. 2012-129010

(51) Int. Cl.
*C09K 19/02* (2006.01)
*C09K 19/30* (2006.01)
(Continued)

(52) U.S. Cl.
CPC ........ *C09K 19/0225* (2013.01); *C09K 19/126* (2013.01); *C09K 19/3001* (2013.01);
(Continued)

(58) Field of Classification Search
None
See application file for complete search history.

(56) References Cited

U.S. PATENT DOCUMENTS 5,061,045 A * 10/1991 Yoneya .................... G02F 1/141
                                                              349/172
5,252,251 A    10/1993 Sato et al.
(Continued)

FOREIGN PATENT DOCUMENTS

JP    1-152430 A    6/1989
JP    0267519 A     3/1990
(Continued)

OTHER PUBLICATIONS

International Search Report dated Feb. 19, 2013, issued in corresponding application No. PCT/JP2012/079506.
(Continued)

*Primary Examiner* — Ashok Patel
(74) *Attorney, Agent, or Firm* — Westerman, Hattori, Daniels & Adrian, LLP

(57) ABSTRACT

The liquid crystal light modulator includes a first substrate (10) and a second substrate (20) disposed between two polarizers, and a pair of electrode structures (24, 24). The substrates include homeotropic alignment films (12) and (22), and at least one of the substrates has a function of aligning C-directors of liquid crystal molecules along one direction. The one direction forms an azimuth angle in the range of 35 to 55 degrees with the direction of the electric field generated by the pair of electrode structures (24, 24). A liquid crystal composition layer (31) contains a ferroelectric
(Continued)

liquid crystal composition having a chiral smectic C phase or a liquid crystal composition that has an achiral smectic C phase and negative dielectric anisotropy. Light transmittance is modulated by the electric field generated by the electrode structures (24, 24) changing the birefringence index of the liquid crystal composition layer (31).

7 Claims, 3 Drawing Sheets

(51) Int. Cl.
G02F 1/141 (2006.01)
G02F 1/1343 (2006.01)
G02F 1/1337 (2006.01)
G02F 1/1335 (2006.01)
C09K 19/34 (2006.01)
C09K 19/12 (2006.01)
C09K 19/04 (2006.01)

(52) U.S. Cl.
CPC ...... C09K 19/3458 (2013.01); C09K 19/3463 (2013.01); G02F 1/1337 (2013.01); G02F 1/133528 (2013.01); G02F 1/134363 (2013.01); G02F 1/141 (2013.01); G02F 1/1416 (2013.01); C09K 2019/0437 (2013.01); C09K 2019/304 (2013.01); C09K 2019/3016 (2013.01); C09K 2019/3027 (2013.01); G02F 1/1418 (2013.01); G02F 2001/133742 (2013.01)

(56) References Cited

U.S. PATENT DOCUMENTS

| | | | |
|---|---|---|---|
| 5,494,762 A | 2/1996 | Isoyama et al. | |
| 5,539,555 A | 7/1996 | Wand et al. | |
| 5,624,600 A * | 4/1997 | Takiguchi | C09K 19/588 252/299.1 |
| 5,728,318 A | 3/1998 | Yamashita et al. | |
| 5,770,109 A | 6/1998 | Beresnev et al. | |
| 6,067,136 A * | 5/2000 | Yamaguchi | G02F 1/13362 349/96 |
| 6,661,494 B1 * | 12/2003 | Dubal | C09K 19/0225 349/100 |
| 6,757,045 B1 * | 6/2004 | Asao | G02F 1/13781 349/134 |
| 2001/0035932 A1 * | 11/2001 | Suzuki | G02F 1/141 349/169 |
| 2003/0218715 A1 | 11/2003 | Okawa et al. | |
| 2005/0062708 A1 | 3/2005 | Yoshihara et al. | |
| 2005/0285998 A1 * | 12/2005 | Saita | G02B 5/3016 349/117 |
| 2008/0204608 A1 | 8/2008 | Takano et al. | |
| 2010/0039597 A1 | 2/2010 | Lin et al. | |
| 2012/0099060 A1 * | 4/2012 | Matsumoto | G02F 1/133371 349/106 |
| 2013/0271686 A1 | 10/2013 | Lim | |

FOREIGN PATENT DOCUMENTS

| | | | |
|---|---|---|---|
| JP | 02176625 | A | 7/1990 |
| JP | 6-75224 | A | 3/1994 |
| JP | 8-136915 | A | 5/1996 |
| JP | 10-282500 | A | 10/1998 |
| JP | 2000-239402 | A | 9/2000 |
| JP | 2001-91719 | A | 4/2001 |
| JP | 2001-226674 | A | 8/2001 |
| JP | 2002530720 | A | 9/2002 |
| JP | 2003-98504 | A | 4/2003 |
| JP | 2003-277754 | A | 10/2003 |
| JP | 2003-280041 | A | 10/2003 |
| JP | 2004-21098 | A | 1/2004 |
| JP | 2004-184522 | A | 7/2004 |
| JP | 2005258463 | A | 9/2005 |
| JP | 2005-338804 | A | 12/2005 |
| JP | 2007-094020 | * | 4/2007 |
| JP | 2007-94020 | A | 4/2007 |
| JP | 2007-231166 | A | 9/2007 |
| JP | 2007-231167 | A | 9/2007 |
| JP | 2008-274235 | A | 11/2008 |
| JP | 2009-108233 | A | 5/2009 |
| JP | 2010-066717 | * | 3/2010 |
| JP | 2010066717 | A | 3/2010 |
| JP | 2010-090277 | A | 4/2010 |
| WO | WO 00-31582 | * | 6/2000 |
| WO | 2011001565 | A1 | 1/2011 |

OTHER PUBLICATIONS

International Search Report dated Feb. 5, 2013 issued in corresponding application No. PCT/JP2012/079651.
Office Action dated Dec. 22, 2016. issued in U.S. Appl. No. 14/359,022 (10 pages).
Office Action dated Mar. 8, 2016. issued in U.S. Appl. No. 14/359,022 (9 pages).
Office Action dated Sep. 29, 2016. issued in U.S. Appl. No. 14/359,022 (11 pages).
Office Action dated Apr. 28, 2016. issued in U.S. Appl. No. 14/358,251 (15 pages).
Office Action dated Oct. 18, 2016. issued in U.S. Appl. No. 14/358,251 (9 pages).
Chenhui Wang, et al., "A Defect Free Bistable C1 SSFLC Display", SID 02 DIGEST, ISSN/0002-0966X/02/3301-0034.
J. Funfschilling, et al., "Fast Responding and Highly Multiplexible Distorted Helix Ferroelectric Liquid-Crystal Displays", J. Appl. Physo 66 (8), Oct. 15, 1989, pp. 3877-3882.
Ju Hyun Lee, et al., "Wide-Viewing Display Configuration of Heilix-Deformed Ferroelectric Liquid Crystals", J. Appl. Physo 66 (8), Oct. 15, 1989, pp. 20-24.
John W. McMurdy, et al., "Vertically Aligned Deformed Helix Ferroelectric Liquid Crystal Configuration for Reflective Display Device", SID 06 DIGEST, ISSN0006-0966X/06/3701, pp. 677-680.
A. Parfenov, "Deformation of ferroelectric short-pitch helical liquid crystal by transverse electric field: Application for diffraction-based light modulator", Applied Physics Letters, vol. 73, No. 24, Dec. 14, 1998, pp. 3489-3491.

* cited by examiner

LIQUID-CRYSTAL OPTICAL MODULATION ELEMENT

TECHNICAL FIELD

The present invention relates to a liquid crystal light modulator manufactured using a liquid crystal composition.

BACKGROUND ART

Ferroelectric liquid crystals (FLCs) are liquid crystals that have spontaneous polarization and are ferroelectric. It is known that when liquid crystals having a permanent dipole moment in a direction perpendicular to the molecular long axis direction form a smectic phase, a layer structure is formed. When the molecular long axes in the layer are tilted, and the liquid crystals form a chiral smectic C (hereinafter abbreviated to SmC*) phase, the permanent dipole moments cannot be cancelled each other out. Thus, the liquid crystals have spontaneous polarization and exhibit ferroelectricity. Application of a voltage to the liquid crystals aligns the permanent dipole moments along the electric field direction and also aligns all the liquid crystal molecules. Ferroelectric liquid crystals having the SmC* phase are widely used in display elements. Ferroelectric liquid crystals are smectic liquid crystals, such as p-decyloxybenzylidene p'-amino 2-methylbutyl cinnamate (DOBAMBC), that have optical activity (chirality). DOBAMBC was designed and synthesized by R. B. Meyer et al. in 1975. Even the addition of an optically active compound having no liquid crystallinity (which is not a liquid crystal compound) can form the SmC* phase. In this case, mother liquid crystals having an achiral smectic C (hereinafter abbreviated to SmC) phase are generally used.

Among smectic phases having a layer structure, the alignment direction of liquid crystal molecules in the SmC* phase is tilted at an angle to the layer normal. The tilt angle (the azimuth angle of direction) to the layer plane can vary slightly layer by layer, thereby forming a helical molecular alignment.

Ferroelectric liquid crystals characteristically have 10 times or more higher responsivity than display elements based on nematic liquid crystals. Ferroelectric liquid crystals first applied to display elements are surface-stabilized ferroelectric liquid crystals (SSFLC), which were devised by Clark and Lagerwall. After that, ferroelectric liquid crystals have been actively studied.

In SSFLC, liquid crystals are aligned using a substrate subjected to parallel alignment treatment such that the layer normal is parallel to the substrate face of the cell (homogeneous alignment), and the thickness of the liquid crystal layer is reduced to loosen a helix, which makes it difficult to tilt liquid crystal molecules on the substrate face. This limits the azimuth angle of direction to two ranges and creates alignment memory (bistability) by the action of surface stabilization, thus resulting in a black-and-white binary display element having the memory. Although such a display element has high-speed responsivity, it is difficult to display gray-scale images using such a binary display element. Furthermore, when heated liquid crystals disposed between substrates are cooled and form a SmC* phase, the liquid crystals are tilted, and the layer interval is reduced. This results in a chevron structure in which the layer plane bends to form a chevron shape, tends to cause a zigzag defect, and results in difficulty in achieving high-contrast. Thus, alignment of liquid crystals has been actively studied to apply the liquid crystals to display elements (see Non-Patent Literature 1).

Distorted helix (or deformed helix) ferroelectric liquid crystals (DHFLC) are also known to have a non-limited range of azimuth angle of direction in order to solve difficulties in gray-scale display resulting from bistability (see Non-Patent Literature 2). In such a method, the helical pitch of FLC is sufficiently reduced and is smaller than the thickness of a liquid crystal layer between substrates. Although such ferroelectric liquid crystals have uniaxial birefringence having an axis in the helix axis direction in the absence of an applied voltage, such ferroelectric liquid crystals under an applied voltage gradually deviate from the helical arrangement of the liquid-crystal alignment and have changes in birefringence, thereby achieving continuous gray-scale displays. However, in DHFLC described in Non-Patent Literature 2, because the layer is perpendicular to the substrate face, that is, the layer normal direction is generally parallel to the substrate face, there is a problem with respect to the viewing angle of the display element.

One of methods for improving the viewing angle of a ferroelectric liquid crystal display element is a technique that has been developed for nematic liquid crystal display elements and has been applied to ferroelectric liquid crystals. In nematic liquid crystals, an electric field perpendicular to the substrate is used in a homeotropic alignment mode, and homeotropic alignment of liquid crystal molecules is utilized to improve the viewing angle. In-plane switching (IPS) is a method for improving the viewing angle by switching homogeneously aligned liquid crystal molecules using a horizontal electric field parallel to the substrate. The homeotropic alignment and IPS can be used in combination. For example, Non-Patent Literatures 3 and 4 describe a liquid crystal display element in which a horizontal electric field is applied to homeotropically aligned DHFLC using in-plane electrodes composed of a pair of interdigitated electrodes disposed on a lower substrate. Non-Patent Literature 5 describes a light modulator in which readout laser beams enter homeotropically aligned DHFLC along various directions while a horizontal electric field is applied to the homeotropically aligned DHFLC. However, in order to achieve a contrast as high as the VA mode developed in nematic liquid crystals using ferroelectric liquid crystals, it is necessary to prevent the formation of a schlieren texture and focal conic alignment defects characteristic of SmC* in homeotropic alignment. To this end, ferroelectric liquid crystals may be homeotropically aligned at a short helical pitch of 400 nm or less. In this case, owing to a high melting point and a narrow temperature range of the SmC* phase as a result of a high concentration of a chiral dopant, the liquid crystal display element has a limited operating temperature range. Furthermore, because a high electric field strength is required to loosen the short-pitch helix, the liquid crystal element requires a high driving voltage. Furthermore, the number of components in the composition needs to be increased to lower the melting point. This reduces the productivity of the ferroelectric liquid crystal display element and becomes a barrier to the practical use of the ferroelectric liquid crystal display element also from an economic point of view. Furthermore, in SSFLCD, it is difficult to recover from a disturbance of alignment resulting from deformation of an element, for example, caused by an external pressure. Although an improvement of the cell structure or polymer stabilization have been proposed, it is not feasible on a large scale.

CITATION LIST

Non Patent Literature

NPL 1: Chenhui Wang and Philip J. Bos, "5.4: A Defect Free Bistable Cl SSFLC Display", SID 02 Digest, 2002, pp. 34-36
NPL 2: J Funfschilling and M. Schadt, "Fast responding and highlymultiplexible distorted helix ferroelectric liquid-crystal displays", J. Appl. Phys., October, 1989, Vol. 66, No. 8, pp. 3877-3882
NPL 3: Ju Hyun Lee, Doo Hwan You, Jae Hong Park, Sin Doo Lee, and Chang Jae Yu, "Wide-Viewing Display Configuration of Helix-Deformed Ferroelectric Liquid Crystals", Journal of Information display, December, 2000, Vol. 1, No. 1, pp. 20-24
NPL 4: John W. McMurdy, James N. Eakin, and Gregory P. Crawford, "P-127: Vertically Aligned Deformed Helix Ferroelectric Liquid Crystal Configuration for Reflective Display Device", SID 06 Digest, 2006, pp. 677-680
NPL 5: A. Parfenov, "Deformation of ferroelectric short-pitch helical liquid crystal by transverse electric field: Application for diffraction-based light modulator", Applied Physics Letters, December, 1998, Vol. 73, No. 24, pp. 3489-3491

SUMMARY OF INVENTION

Technical Problem

The present invention provides a liquid crystal light modulator that contains a homeotropically aligned liquid crystal composition and allows high-speed response at a lower driving voltage.

Solution to Problem

In order to solve the problems described above, the present inventors studied on the alignment of C-directors of homeotropically aligned liquid crystals. As a result, the present inventors completed the present invention by finding that a substantially completely loosen helix in the absence of an electric field and unidirectionally aligned C-directors allow low-voltage driving without high electric field strength, which has hitherto been required to loosen the helix.

The present invention provides a liquid crystal light modulator that includes:

two polarizers that have planes of polarization perpendicular to each other;

a first substrate and a second substrate disposed between the polarizers and holding a liquid crystal composition layer therebetween, at least one of the first and second substrates being transparent; and a pair of electrode structures that generate an electric field generally parallel to a substrate face of at least one of the first substrate and the second substrate, at least one of substrates being transparent, wherein at least one of the first substrate and the second substrate has a homeotropic alignment film and has a function of aligning C-directors of liquid crystal molecules along one direction, the one direction forms an azimuth angle in the range of 35 to 55 degrees with the direction of the electric field generated by the pair of electrode structures, the liquid crystal composition layer contains a ferroelectric liquid crystal composition having a chiral smectic C phase or a liquid crystal composition that has an achiral smectic C phase and negative dielectric anisotropy, and C-directors of liquid crystal molecules are aligned by the alignment function along the one direction at contact portions between the liquid crystal composition layer and the first substrate and between the liquid crystal composition layer and the second substrate, the C-directors of the liquid crystal molecules are parallel to each other between the first substrate and the second substrate, the C-directors of the liquid crystal molecules are aligned at an azimuth angle in the range of 35 to 55 degrees with the electric field direction generally parallel to the substrate face, and light transmittance is modulated by the electric field generated by the electrode structures changing the birefringence index of the liquid crystal composition layer.

Advantageous Effects of Invention

In a liquid crystal light modulator according to the present invention, the formation of a pretilt angle, for example, by rubbing alignment treatment of a homeotropic alignment film surface allows C-directors of a SmC or SmC* phase to be aligned along the rubbing direction. As a result, the helix is substantially completely loosened also in the absence of an electric field, thereby achieving high-speed responsivity at a lower driving voltage.

DESCRIPTION OF EMBODIMENTS

The present invention will be further described below with preferred embodiments with reference to the accompanying drawings.

Figure 1A:
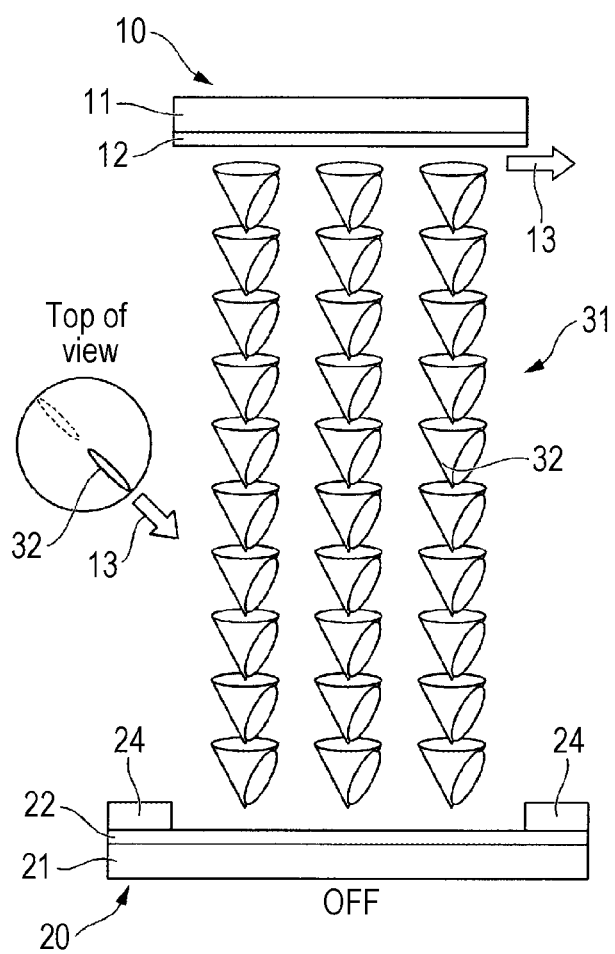
FIG. 1A is a schematic view of a liquid crystal display element according to an embodiment of the present invention in the OFF state.
Figure 1B:
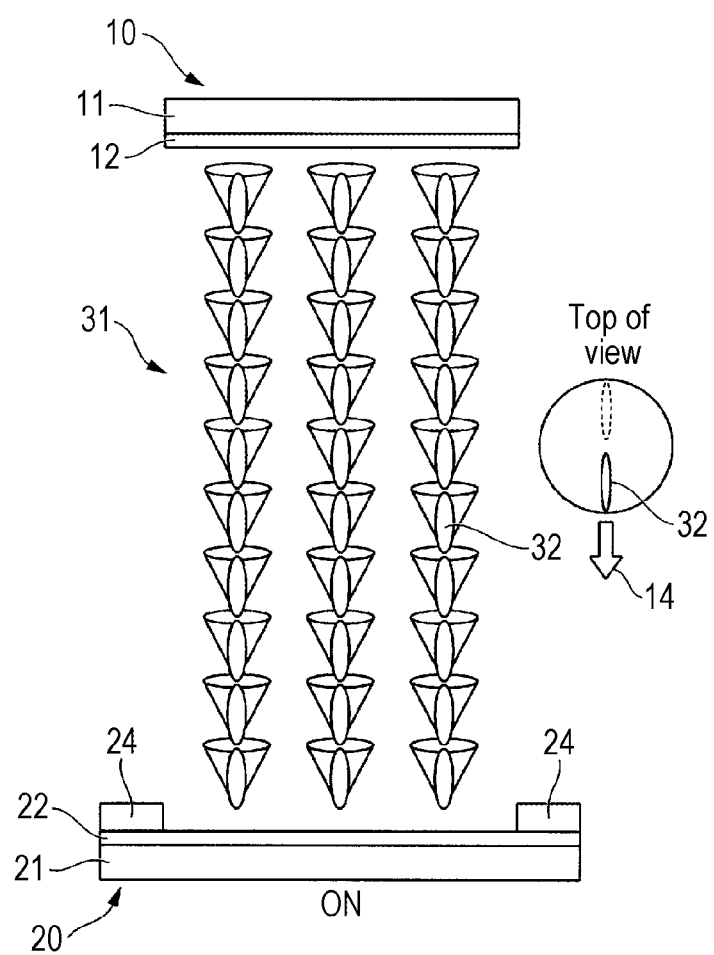
FIG. 1B is a schematic view of a liquid crystal display element according to an embodiment of the present invention in the ON state.

FIGS. 1A and 1B illustrate a liquid crystal display element according to an embodiment of the present invention. FIG. 1A illustrates the OFF state, and FIG. 1B illustrates the ON state.

The liquid crystal display element includes a cell having a structure that includes a pair of substrates 10 and 20, which are composed of transparent substrates, such as glass plates 11 and 21, and alignment films 12 and 22. A liquid crystal composition layer 31 disposed between the first substrate 10 and the second substrate 20 contains a ferroelectric liquid crystal composition having a chiral smectic C phase or a liquid crystal composition that has an achiral smectic C phase and negative dielectric anisotropy. The substrates 10 and 20 and the liquid crystal composition layer 31 are disposed between two polarizers (not shown). The planes of polarization of the two polarizers are perpendicular to each other (crossed nicols).

A liquid crystal composition having a chiral smectic C phase (hereinafter referred to as a "smectic C* phase") or an achiral smectic C phase (hereinafter referred to as a "smectic C phase") has a helical molecular long axis. In the case of the smectic C* phase, the helix axis is perpendicular to a substrate face of a substrate having a homeotropic alignment film. Furthermore, selective reflection is induced around a center wavelength depending on the helical pitch. The center wavelength of the selective reflection can be represented by the product of the average refractive index n of the composition and the helical pitch P in SmC*, n×P. The center wavelength depends on the refractive index of a chiral dopant composition as well as the type and amount of the chiral dopant composition. In a liquid crystal display element according to the present invention, the helix is preferably substantially completely loosened. Even in the presence of a helix, an infrared light zone or a longer wavelength zone is preferred. Selective reflection equivalent to the cell thickness or more, for example, selective reflection in the range of 3,000 to 500,000 nm is preferred. This reduces the winding force of the helix and obviates the need for high electric field strength required to loosen the helix, thus allowing low-voltage driving. The helical pitch is more preferably 8 times or more the cell thickness in order to substantially completely loosen the helix. When the helix is substantially completely loosened, C-directors are aligned along one direction and are uniaxially aligned. An alignment method for aligning C-directors along one direction includes subjecting a homeotropically aligned SmC* phase to alignment treatment such that the SmC* phase is provided with a pretilt angle in one direction using a homeotropic alignment film in a nematic liquid crystal phase. Without this alignment treatment, C-directors turn toward different directions, and polarizing microscope observation with visible light scattered by vibrations caused by thermal fluctuations shows a schlieren texture. A display element made from this exhibits slightly cloudiness, thus making it difficult to achieve high contrast. However, for example, when a homeotropic alignment film is subjected to rubbing treatment, and directors of liquid crystal molecules are provided with a pretilt angle so as to be tilted in one direction with respect to a substrate face, C-directors are aligned along the rubbing direction, the schlieren texture disappears, and uniaxial alignment of the C-directors substantially along one direction results in a dark field. This is a major characteristic.

The alignment treatment that can provide a pretilt angle in one direction using a homeotropic alignment film in a nematic liquid crystal phase involves rubbing treatment on a surface of a homeotropic alignment film, such as a polyimide film. The alignment treatment of a nematic liquid crystal cell in a VA mode can provide a pretilt angle for a homeotropically aligned liquid crystal molecular long axis. The rubbing direction defines the azimuthal direction of the tilted liquid crystal molecular long axis in switching. Application of an alignment film having such characteristics to a homeotropically aligned SmC* phase or SmC phase advantageously allows C-directors to be aligned along the rubbing direction. Thus, an alignment film having such characteristics may be used. The alignment film may be a polyimide alignment film for homeotropic alignment or a photo-alignment film for homeotropic alignment that can provide a nematic liquid crystal with a pretilt angle. The alignment film may also be a photo-alignment film provided with a pretilt angle. The degree of the pretilt angle may be such that a schlieren texture in a homeotropically aligned SmC* phase or SmC phase disappears, and C-directors can be aligned along the rubbing alignment direction.

The first substrate 10 and the second substrate 20 have the homeotropic alignment films 12 and 22. At least one of the homeotropic alignment films 12 and 22 is subjected to alignment treatment that can provide a pretilt angle in one direction 13 (see the top of view in FIG. 1A). In the OFF state in the absence of an electric field, this can align C-directors of liquid crystal molecules 32 along one direction 13 at contact portions between the ferroelectric liquid crystal composition layer 31 and the homeotropic alignment films 12 and 22 subjected to the alignment treatment and align C-directors in a SmC* phase or SmC phase along the alignment treatment direction, thereby eliminating the schlieren texture and achieving uniaxial alignment. Thus, a polarization axis of one of the two polarizers can be turned toward the direction 13 to display black. Electrodes 24 (IPS electrodes) that can generate a horizontal electric field with respect to the substrate face can be used as a means for moving liquid crystal molecules using a voltage to display images in the ON state.

When the homeotropic alignment films 12 and 22 are subjected to alignment treatment that can provide a pretilt angle in one direction, the direction 13 of the alignment treatment of the first homeotropic alignment film 12 may be different from the direction of the alignment treatment of the second homeotropic alignment film 22. However, the directions of the alignment treatment of the homeotropic alignment films 12 and 22 are preferably the same because it is easy to align all the C-directors in the liquid crystal composition 31 between the substrates along one direction 13. Only one of the homeotropic alignment films 12 and 22 may be subjected to alignment treatment that can provide a pretilt angle.

In the case of a smectic C phase, which does not have a helical structure, C-directors subjected to the alignment treatment are aligned along one direction and are uniaxially aligned. An increase in cell thickness may result in a disturbance of uniaxial alignment. In this case, a very small amount of chiral dopant is preferably added so as not to form a helix. The added chiral molecules can propagate alignment regulating force applied to C-directors on the substrate face to the interior of the cell, improve uniaxial alignment, and effectively improve contrast.

The pair of electrode structures 24 and 24 disposed on a substrate face of at least one of the first substrate 10 and the second substrate 20 generates an electric field generally parallel to the substrate face. When the liquid crystal composition layer 31 that has a smectic C phase and negative dielectric anisotropy or the liquid crystal composition 31 that has a permanent dipole in a vertical direction of the liquid crystal molecules 32, has ferroelectricity that induces spontaneous polarization, and has a substantially completely loosened helix is aligned along the direction 14 of the liquid crystal molecules 32 in the top of view in FIG. 1B by the electric field generated by the electrode structures 24 and 24, this changes the birefringence index and modulates light transmittance in proportion to voltage. The direction 14 more preferably forms approximately 45 degrees with a polarization axis of the crossed nicols because this can achieve the maximum transmittance in the ON state. In the embodiment illustrated in the figures, in the OFF state, the C-directors of the liquid crystal molecules 32 are aligned along the alignment treatment direction 13, the C-directors of the liquid crystal molecules 32 at contact portions with the first substrate 10 and the second substrate 20 are aligned along one direction by the alignment function, and the C-directors of the liquid crystal molecules 32 are parallel to each other between the first substrate 10 and the second substrate 20 (see the top of view in FIG. 1A). When the directions of the C-directors of the liquid crystal molecules 32 are adjusted to be the direction of a polarization axis of the polarizers, light incident from one of the two polarizers of the crossed nicols cannot be transmitted through the other polarizer, thereby providing a dark field (black) as described above. The electrode structures 24 and 24 may be interdigitated electrodes (IPS electrodes) or fring field switching (FFS) electrodes. The electrode structures 24 and 24 may be disposed on both faces of each of the substrate 10 and the substrate 20.

When the application of a horizontal electric field is gradually strengthened through interdigitated electrodes (IPS electrodes) disposed on a substrate face, the liquid crystal molecular long axes are gradually aligned perpendicularly to the horizontal electric field while the helix remains loosened, thereby increasing transmittance. The resulting change in retardation (Δnd, wherein Δn denotes the birefringence index and d denotes the cell thickness) is similar to that in the ECB mode in nematic liquid crystals. Thus, in order to maximize transmittance, the retardation must coincide with λ/2. λ denotes the wavelength of transmitting light (a measure of central tendency). In general, λ is approximately 550 nm, at which visibility is highest.

The intensity I of light from a cell having the retardation (Δnd) is represented by Formula 1.

[Math. 1]

$$I = I_0 \sin^2\left(\frac{\pi \cdot \Delta n \cdot d}{\lambda}\right) \quad \text{(Formula 1)}$$

In Formula 1, $I_0$ denotes the incident light intensity. Transmittance is represented by the ratio $I/I_0$.

Formula 1 shows that transmittance is highest at $\Delta nd = \pi/2$. In order to determine Δn, Formula 1 can be transformed into Formula 2.

[Math. 2]

$$\Delta n = \frac{\lambda}{\pi \cdot d} \sin^{-1}\sqrt{\frac{I}{I_0}} \quad \text{(Formula 2)}$$

Ideally, the exit light intensity I may be 1 for the incident light intensity $I_0 = 1$. To satisfy this, the retardation (a product Δnd) may be λ/2=275 nm.

Figure 2:
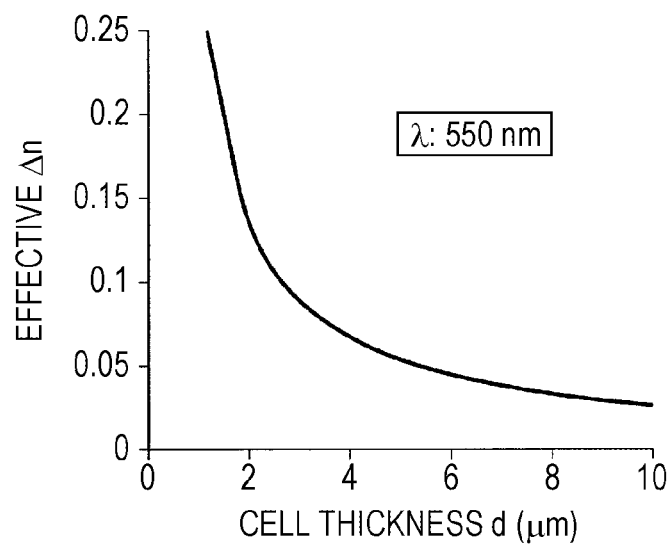
FIG. 2 is a graph showing the relationship between the cell thickness d and $\Delta n$ at which transmittance is highest.

FIG. 2 is a graph showing the relationship between the cell thickness d and Δn at which transmittance is highest. Thus, light can be transmitted with little loss at approximately 550 nm by adjusting the cell thickness to the Δn of the ferroelectric liquid crystal material to be used. For full-color display, color balance must be considered. Thus, the wavelength of λ/2 may be adjusted to the wavelength dispersion characteristics of retardation or the spectrum of a color filter or backlight to be used.

Δn of liquid crystals in the present invention refers to Δn effective for the voltage—transmittance characteristics of the present liquid crystal element when the refractive index $n_e$ in the molecular long axis direction, the refractive index $n_o$ in the molecular short axis direction, and the tilt angle θ determined while the helix is loosened by substrate alignment treatment in the absence of a voltage are used (Formula 3). The effective Δn in FIG. 2 refers to Δn represented by Formula 3.

[Math. 3]

$$\Delta n = n_{\text{eff}} - n_o = \frac{n_e n_o}{\sqrt{n_o^2 \sin^2\theta + n_e^2 \cos^2\theta}} - n_o \quad \text{(Formula 3)}$$

In the voltage OFF state, C-directors may be aligned along at least one polarization axis direction. Because blackness depends on the degree of alignment of C-directors, the C-director alignment function is preferably optimized to improve uniaxial alignment by adjusting the alignment film material, alignment treatment method, or alignment treatment conditions.

The C-directors of the liquid crystal molecules 32 can be aligned by the alignment function along one direction at contact portions between the liquid crystal composition layer 31 and the first substrate 10 and between the liquid crystal composition layer 31 and the second substrate 20. The C-directors of the liquid crystal molecules 32 can be parallel to each other between the first substrate 10 and the second substrate 20. The C-directors of the liquid crystal molecules 32 can be substantially aligned at an azimuth angle in the range of 35 to 55 degrees with the electric field direction generally parallel to a substrate face. Light transmittance can be modulated by the electric field generated by the electrode structures 24 and 24 changing the birefringence index of the liquid crystal composition layer 31. The azimuth angle of direction preferably ranges from 40 to 50 degrees, more preferably 42 to 48 degrees, most preferably 45 degrees.

In order to provide a bright field in response to the application of a voltage, the alignment direction due to alignment treatment, such as rubbing treatment, of a substrate preferably forms an angle of 45 degrees with the direction of the electric field generated by the pair of electrode structures 24 and 24.

In order to provide a dark field in the absence of an electric field, the liquid crystal composition layer is a liquid crystal light modulator in which the chiral smectic C phase or achiral smectic C phase has a substantially completely loosened helix axis and has a layer structure parallel to a substrate face, and C-directors of liquid crystal molecules are aligned along one direction. The alignment direction due to alignment treatment, such as rubbing treatment, of a substrate coincides with the polarization direction within ±1 degree, more preferably ±0.5 degrees, most preferably 0 degrees.

Figure 3A:
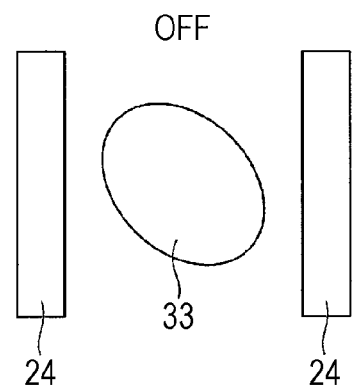
FIG. 3A is a schematic top view of a refractive index distribution in the OFF state.
Figure 3B:
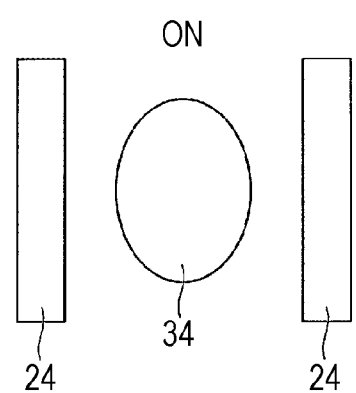
FIG. 3B is a schematic top view of a refractive index distribution in the ON state.

Retardation under an applied voltage depends on the applied voltage. FIGS. 3A and 3B are top views of a refractive index distribution between the IPS electrodes 24. As described above, in the absence of a voltage, an elliptical refractive index distribution 33 forms an azimuth angle in the range of 35 to 55 degrees with the electric field direction. When liquid crystal molecules in the smectic C phase have negative dielectric anisotropy, in response to the application of a voltage, the long axes of the liquid crystal molecules tend to be aligned perpendicularly to the electric field direction, and the refractive index distribution becomes an elliptical refractive index distribution 34. In a smectic C* phase, permanent dipoles are aligned perpendicularly to the molecular long axes by the action of a horizontal electric field of the electrodes, and simultaneously the molecular long axes are aligned along the major axis of the ellipse. Thus, the refractive index distribution becomes an elliptical refractive index distribution 34 generally perpendicular to the electric field direction. With an increase in voltage, the major axes of both of the ellipses increase along the IPS electrodes, Δn increases, and the ellipticity increases. When a polarization axis of one of polarizers perpendicular to this state is turned 45 degrees with the major axis of the ellipse, the exit light intensity can be highest. Furthermore, as described above, retardation saturated due to an electric field is preferably adjusted to be λ/2 to increase the exit light intensity. Since it is important to increase transmittance in the entire visible region in terms of the brightness and color balance of display, the λ/2 may be approximately 275 nm, preferably in the range of 225 to 330 nm, depending on the color tone of a display element. Thus, the cell thickness is determined by dividing the maximum retardation under an applied voltage by Δn of a ferroelectric liquid crystal composition to be used and preferably ranges from 2 to 15 μm.

In the range of selective reflection of a liquid crystal for use in the present invention, even when the deformation of an element, for example, due to an external pressure disturbs alignment, the original alignment state can be recovered by the winding force of the helix. This high reliability is a major characteristic.

In order to fill a space between substrates with liquid crystals without alignment defects, a known vacuum injection method, liquid crystal dropping and injection method (One Drop Fill), or flexography method may be performed. It is preferable to at least heat an isotropic phase or a nematic phase and change the nematic phase to a smectic phase by cold removal. The ferroelectric liquid crystal composition preferably has a phase sequence of at least an isotropic phase, a chiral nematic phase, a smectic A phase, and a chiral smectic C phase (ISO-N*-SmA-SmC*) from a high-temperature side or a phase sequence of at least an isotropic phase, a chiral nematic phase, and a chiral smectic C phase (ISO-N*-SmC*) from the high-temperature side. In this case, another phase, like a blue phase (BP), may be disposed on the high-temperature side of the nematic phase. For example, the phase sequence may be an isotropy liquid-blue phase-chiral nematic phase-smectic A phase-chiral smectic C phase or an isotropy liquid-blue phase-chiral nematic phase-chiral smectic C phase. Liquid crystals having a phase sequence of an isotropy liquid-chiral smectic C phase (ISO-SmC*) may also be used.

In order to increase the tilt angle of a liquid crystal compound, the phase sequence preferably includes no smectic A phase. Specific examples include ISO-N*-SmC* (INC) or ISO-SmC* (IC).

In the phase sequence of the ferroelectric liquid crystal composition, the chiral nematic phase preferably has a helical pitch of at least 50 μm or more at a temperature 2° C. higher than the lower limit temperature of the chiral nematic phase. The lower limit temperature is the temperature of a phase transition from the chiral nematic phase to the smectic A phase or chiral smectic C phase during temperature decrease. In this case, when the liquid crystals form the chiral nematic phase, the helical pitch is much greater than the cell thickness (gap), and the chiral nematic phase does not have a helical structure. Thus, satisfactory homeotropic alignment without alignment defects can be obtained before transition to the smectic phase, and more uniform alignment can be obtained. In order to loosen the helical pitch of the chiral nematic phase and induce a phase transition to the smectic phase, the temperature width is preferably at least 10° C. or more. A narrow temperature width may result in no loosening of the helix and result in a phase transition to the smectic phase, thereby causing alignment defects. Furthermore, as a method for loosening the helix of the chiral nematic phase, a pitch canceller having a reverse helix may be added to adjust the helix.

The alignment state in the absence of a voltage is a SmC or SmC* phase of a VA mode. Since the movement of C-directors is similar to that of a display element of an IPS mode that includes nematic liquid crystals, a phase compensation plate for use in the IPS mode may be used. If necessary, an optical compensation film, such as an A plate, a uniaxially stretched negative C plate, or a biaxially stretched Z plate, may be used to improve the contrast or viewing angle.

Although a light source for the liquid crystal display element is not particularly limited, LED is preferred because of its low power consumption. In order to further reduce power consumption, blinking control (a technique of decreasing light quantity in a dark region or turning off a light in a dark region), a multi-field drive technique (a technique of using different driving frequencies for motion pictures and still pictures), a technique of changing the light quantity mode between the interior and the outdoors or between nighttime and daytime, or a technique of temporarily stopping driving utilizing the memory of a liquid crystal display element is preferably used. A reflective display element is also preferred because external illumination (such as sunlight or room light) can be used without a light source.

The liquid crystal display element may also exhibit 3D displays by time division, including a field sequential method, space division, including a polarization method, a parallax barrier method, or an integral imaging method, wavelength division, including a spectral method or anaglyph, or an FPS mode.

For low-voltage driving, each of the pair of substrates may be provided with a pair of a pixel electrode and a common electrode. For low-voltage driving, each of the pair of substrates may be provided with in-plane switching (IPS) electrodes, or confined geometry (Lee, S.-D., 2009, IDW '09-Proceeding of the 16th International Display Workshots 1, pp. 111-112), which is an element that has an electrode protruding toward the interior of a cell and is less likely to have a poor electric field strength distribution in the cell, may be used, or each of the pair of substrates may be provided with fringe-field switching (FFS) electrodes.

In order to improve contrast, it is preferable to use blinking control (a technique of decreasing light quantity in a dark region or turning off a light in a dark region), an element having an opening ratio of 50% or more, an alignment film having high alignment ability, an anti-glare film, or a field sequential method (a colorization method for successively lighting RGB-color LEDs in a shorter time than the temporal resolution of the human eye and thereby allowing colors to be perceived without using a color filter).

For high-speed responsivity, an overdrive function (the voltage for gray-scale display is increased at start-up and is decreased at the falling edge) is preferably used, or smectic liquid crystals having negative dielectric anisotropy and smectic liquid crystals exhibiting spontaneous polarization are preferably used in combination.

A film for covering a touch panel surface preferably has water repellency and oil repellency, antifouling properties, and fingerprint resistance, in order to suppress the degradation of display quality due to contamination. At least an electrode substrate on a side to be pressed is preferably a flexible substrate, such as a plastic substrate or a thin glass substrate.

Graphene (a sheet formed of a carbon monoatomic layer) or an organic semiconductor is preferably used in an electrode.

Two substrates of a liquid crystal cell may be made of glass or a flexible transparent material, such as a plastic. One of the two substrates may be made of an opaque material, such as silicon. A transparent substrate having a transparent electrode layer may be produced by the deposition of indium tin oxide (ITO) on a transparent substrate, such as a glass plate, by sputtering.

A color filter may be produced by a pigment dispersion method, a printing method, an electrodeposition method, or a staining method. For example, a method for producing a color filter using a pigment dispersion method will now be described. A curable coloring composition for a color filter is applied to a transparent substrate, is patterned, and is cured by heating or photoirradiation. This process is performed repeatedly to produce red, green, and blue pixel units of a color filter. A pixel electrode that includes an active element, such as a thin-film transistor (TFT), a thin-film diode, or a metal insulator metal specific resistance element, composed of an organic semiconductor, an inorganic semiconductor, or an oxide semiconductor may be disposed on the substrate.

In order to improve reliability or perform TFT driving, impurities may be removed from a ferroelectric liquid crystal composition. In order to further increase specific resistance, purification treatment using silica or alumina may be performed. A liquid crystal composition preferably has a specific resistance of $10^{11}$ Ω·cm or more, more preferably $10^{12}$ Ω·cm or more, still more preferably $10^{13}$ Ω·cm or more, for TFT driving. As a method for suppressing the effects of a cation present as an impurity in a liquid crystal composition, a cationic inclusion complex, such as a podand, coronand, or cryptand, may be added. In TFT driving, image information is written at regular time intervals, between which electric charges are held between electrodes to display images. Switching decreases the electric charges held between the electrodes by the effects of a polarization switching current due to spontaneous polarization. Thus, an auxiliary capacitor is preferably connected to pixels. An auxiliary capacitor suitable for spontaneous polarization of liquid crystals to be used can be connected.

In order to maintain the performance of a liquid crystal display element even in a low-temperature environment, a ferroelectric liquid crystal composition preferably has low-temperature storage stability. With respect to the low-temperature storage stability of a liquid crystal composition, it is preferable to maintain SmC* in an environment of 0° C. or less for 24 hours or more, more preferably −20° C. or less for 500 hours or more, still more preferably −30° C. or less for 700 hours or more.

<Ferroelectric Liquid Crystal Composition>

A ferroelectric liquid crystal composition for use in the present invention can contain a chiral compound (dopant) in host liquid crystals (mother liquid crystals). Furthermore, a monomer for realizing polymer stabilization (polymerizable compound) may be added to the ferroelectric liquid crystal composition.

Such a ferroelectric liquid crystal composition can be used to stabilize alignment or improve the response speed in a halftone. In order to fix the state of liquid crystals aligned, for example, using an alignment film without alignment defects, like the case where no monomer is added, it is preferable to at least induce a phase transition from a nematic phase to a smectic phase by cold removal, and more preferably a liquid crystal cell has a flat substrate face. Furthermore, it is necessary to polymerize the monomer in a liquid crystal phase, such as a nematic phase or a smectic phase, such that the monomer has a network or dispersed state. Furthermore, in order to prevent the formation of a phase separation structure, it is preferable to decrease the monomer content and adjust the polymer precursor content or the precursor composition such that a network polymer can be formed between liquid crystal molecules while liquid crystals are aligned. In the case of photopolymerization, it is preferable to adjust the UV exposure time, UV exposure intensity, and temperature so as to form a network polymer without liquid-crystal alignment defects.

<Liquid Crystal Compound>

A liquid crystal compound serving as a host is preferably a liquid crystal compound represented by the following general formula.

[Chem. 1]

$$R-Z-A-(Z-A)_n-Z-R \quad (LC-0)$$

(wherein R each independently denotes a linear or branched alkyl group having 1 to 18 carbon atoms, a hydrogen atom, or a fluorine atom, one or two nonadjacent —$CH_2$— groups in the alkyl group may be substituted by —O—, —S—, —CO—, —CO—O—, —O—CO—, —CO—S—, —S—CO—, —O—$SO_2$—, —$SO_2$—O—, —O—CO—O—, —CH=CH—, —C≡C—, a cyclopropylene group, or —Si(CH$_3$)$_2$—, and one or more hydrogen atoms in the alkyl group may be substituted by a fluorine atom, a chlorine atom, a bromine atom, or a CN group, Z each independently denotes —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —O—SO$_2$—, —SO$_2$—O—, —CF$_2$O—, —OCF$_2$—, —CFS—, —SCF$_2$, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—CO—O—, —O—CO—CH=CH—, or a single bond, and R$^a$ in —CO—N(R$^a$)— or —N(R$^a$)—CO— denotes a hydrogen atom or a linear or branched alkyl group having 1 to 4 carbon atoms, A each independently denotes a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, or an indandiyl group, one or two or more —CH= groups in the ring(s) of the phenylene group, naphthalenediyl group, tetrahydronaphthalenediyl group, or indandiyl group may be substituted by a nitrogen atom, one or two nonadjacent —CH$_2$— groups in the ring(s) of the cyclohexylene group, dioxolanediyl group, cyclohexenylene group, bicyclo[2.2.2]octylene group, piperidinediyl group, decahydronaphthalenediyl group, tetrahydronaphthalenediyl group, or indandiyl group may be substituted by —O— and/or —S—, and one or more hydrogen atoms of the cyclic group may be substituted by a fluorine atom, a chlorine atom, a bromine atom, a CN group, a NO$_2$ group, an alkyl group, an alkoxy group, an alkylcarbonyl group, or an alkoxycarbonyl group, the alkyl group, alkoxy group, alkylcarbonyl group, or alkoxycarbonyl group each having 1 to 7 carbon atoms, one or two or more hydrogen atoms of the alkyl group, alkoxy group, alkylcarbonyl group, or alkoxycarbonyl group being optionally substituted by a fluorine atom or a chlorine atom, and n is 1, 2, 3, 4, or 5.)

Liquid crystal compounds (LC-I) to (LC-III) represented by the following general formulae are preferred.

[Chem. 2]

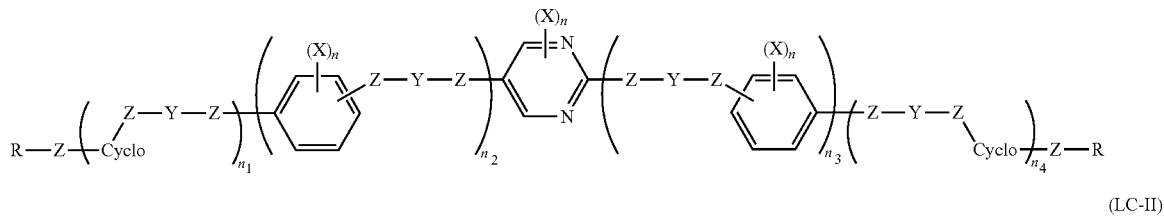

(LC-I)

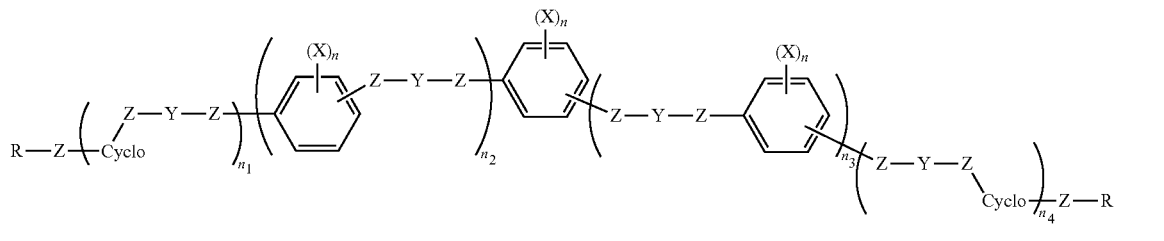

(LC-II)

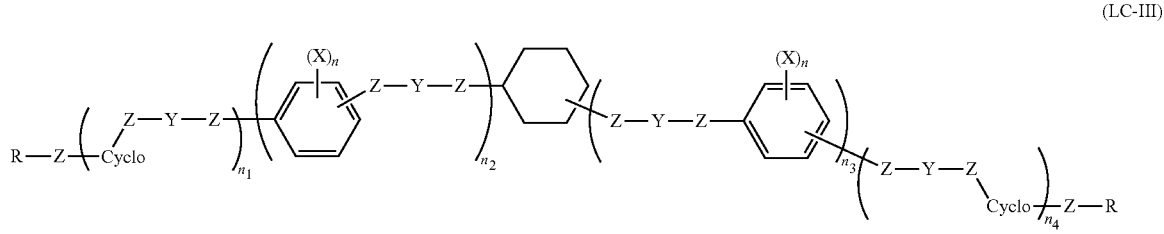

(LC-III)

(wherein R each independently denotes a linear or branched alkyl group having 1 to 18 carbon atoms, a hydrogen atom, or a fluorine atom, one or two nonadjacent —$CH_2$— groups in the alkyl group may be substituted by —O—, —S—, —CO—, —CO—O—, —O—CO—, —CO—S—, —S—CO—, —O—$SO_2$—, —$SO_2$—O—, —O—CO—O—, —CH=CH—, —C≡C—, a cyclopropylene group, or —$Si(CH_3)_2$—, and one or more hydrogen atoms in the alkyl group may be substituted by a fluorine atom, a chlorine atom, a bromine atom, or a CN group, Z each independently denotes —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —O—$SO_2$—, —$SO_2$—O—, —$CF_2O$—, —$OCF_2$—, —$CF_2S$—, $SCF_2$, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond, and $R^a$ in —CO—N($R^a$)— or —N($R^a$)—CO— denotes a hydrogen atom or a linear or branched alkyl group having 1 to 4 carbon atoms, Y each independently denotes a single bond or a linear or branched alkylene group having 1 to 10 carbon atoms, one or two or more methylene groups in the alkylene group may be each independently substituted by —O—, —CO—, —COO—, or —OCO—, provided that the oxygen atoms are not directly bonded to each other, and one or two or more hydrogen atoms in the alkylene group may be each independently substituted by a halogen atom or an alkyl group having 1 to 9 carbon atoms, X each independently denotes a halogen atom, a cyano group, a methyl group, a methoxy group, —$CF_3$, or —$OCF_3$, n is each independently an integer in the range of 0 to 4, $n_1$, $n_2$, $n_3$, and $n_4$ are each independently 0 or 1, provided that $n_1+n_2+n_3+n_4=1$ to 4, and Cyclo each independently denotes a cycloalkane having 3 to 10 carbon atoms and may have a double bond.)

Cyclo is preferably cyclohexane (a cyclohexylene group). For example, liquid crystal compounds (LC-I') to (LC-III') represented by the following general formulae are preferred.

[Chem. 3]

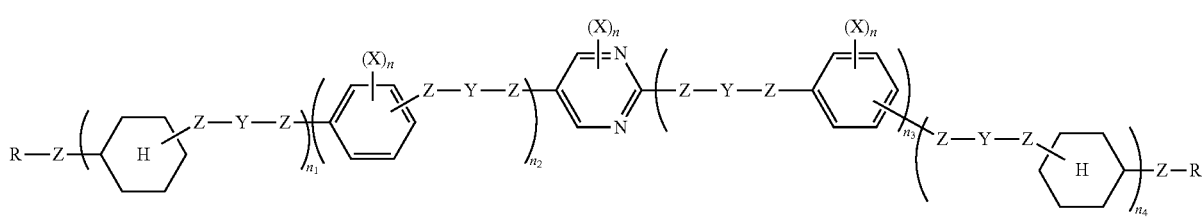

(LC-I')

-continued

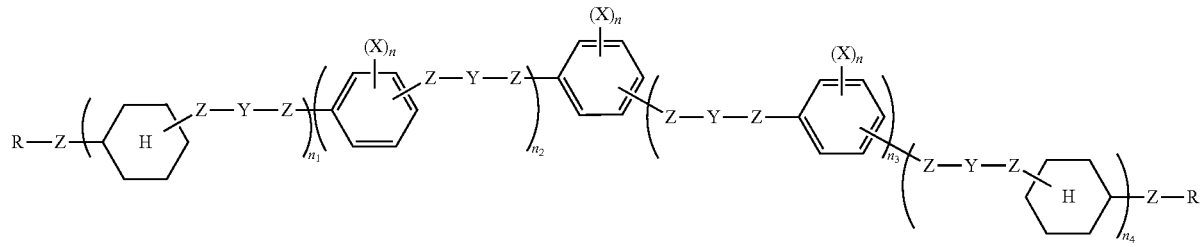
(LC-II')

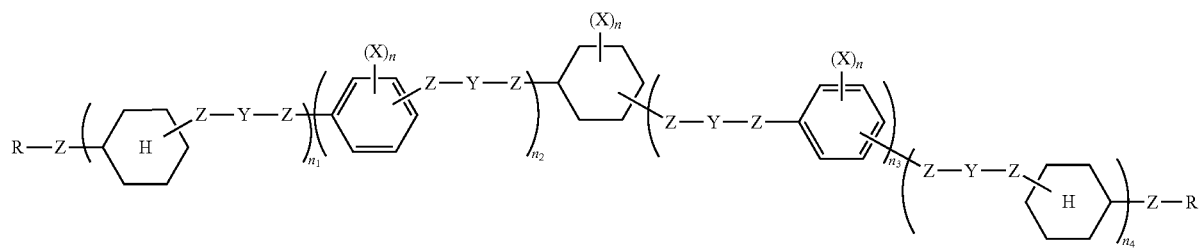
(LC-III')

(wherein R each independently denotes a linear or branched alkyl group having 1 to 18 carbon atoms, a hydrogen atom, or a fluorine atom, one or two nonadjacent —CH$_2$— groups in the alkyl group may be substituted by —O—, —S—, —CO—, —CO—O—, —O—CO—, —CO—S—, —S—CO—, —O—SO$_2$—, —SO$_2$—O—, —O—CO—O—, —CH═CH—, —C≡C—, a cyclopropylene group, or —Si(CH$_3$)$_2$—, and one or more hydrogen atoms in the alkyl group may be substituted by a fluorine atom, a chlorine atom, a bromine atom, or a CN group, Z each independently denotes —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —O—SO$_2$—, —SO$_2$—O—, —CF$_2$O—, —OCF$_2$—, —CF$_2$S—, SCF$_2$, —CH$_2$CH$_2$—, —CF$_2$CH$_2$—, —CH$_2$CF$_2$—, —CF$_2$CF$_2$—, —CH═CH—, —CF═CH—, —CH═CF—, —CF═CF—, —C≡C—, —CH═CH—CO—O—, —O—CO—CH═CH—, or a single bond, and R$^a$ in —CO—N(R$^a$)— or —N(R$^a$)—CO— denotes a hydrogen atom or a linear or branched alkyl group having 1 to 4 carbon atoms, Y each independently denotes a single bond or a linear or branched alkylene group having 1 to 10 carbon atoms, one or two or more methylene groups in the alkylene group may be each independently substituted by —O—, —CO—, —COO—, or —OCO—, provided that the oxygen atoms are not directly bonded to each other, and one or two or more hydrogen atoms in the alkylene group may be each independently substituted by a halogen atom or an alkyl group having 1 to 9 carbon atoms, X each independently denotes a fluorine atom, a chlorine atom, a bromine atom, a cyano group, a methyl group, a methoxy group, a CF$_3$ group, or an OCF$_3$ group, n is each independently an integer in the range of 0 to 4, and $n_1$, $n_2$, $n_3$, and $n_4$ are each independently 0 or 1, provided that $n_1+n_2+n_3+n_4=1$ to 4.)

In order to exhibit liquid crystallinity, 1,4-substitution of the ring(s) is preferred. More specifically, the cyclic divalent group in the liquid crystal compound is preferably a 1,4-cyclohexylene group, a 1,4-phenylene group, or a 2,5-pyrimidinediyl group, for example.

For example, liquid crystal compounds (LC-Ia) to (LC-IIIa) represented by the following general formulae are preferred.

[Chem. 4]

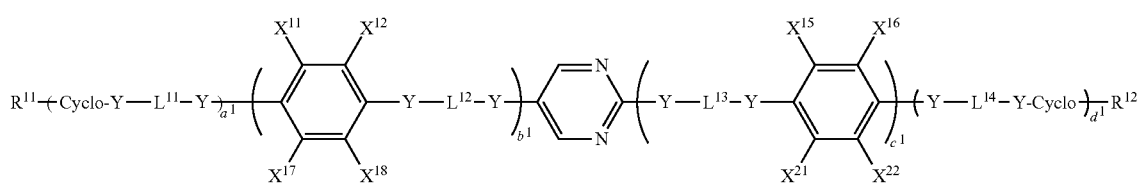
(LC-Ia)

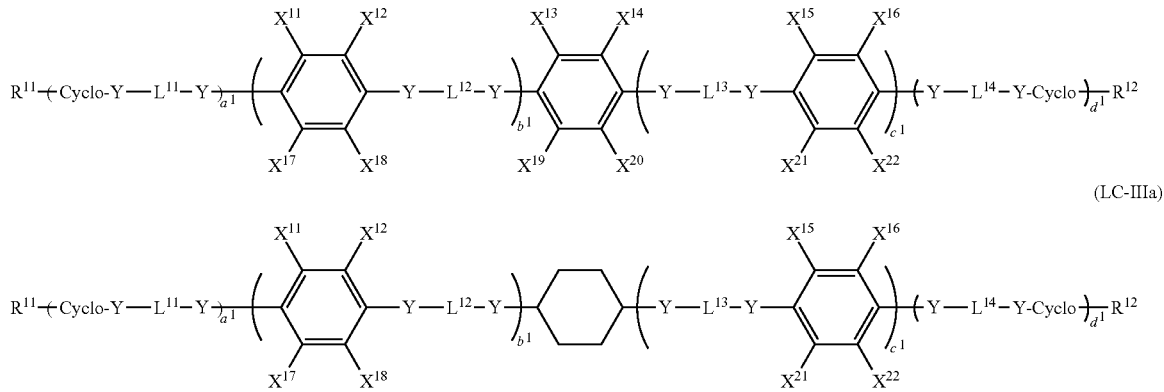

(wherein $R^{11}$ and $R^{12}$ each independently denote a linear or branched alkyl group having 1 to 18 carbon atoms or a fluorine atom, provided that $R^{11}$ and $R^{12}$ are not simultaneously a fluorine atom, one or two nonadjacent —$CH_2$— groups in the alkyl group may be substituted by —O—, —S—, —CO—, —CO—O—, —O—CO—, —CO—S—, —S—CO—, —O—CO—O—, —CH=CH—, —C≡C—, a cyclopropylene group, or —Si(CH$_3$)$_2$—, and one or more hydrogen atoms in the alkyl group may be substituted by a fluorine atom or a CN group, $X^{11}$ to $X^{22}$ each independently denote a hydrogen atom, a fluorine atom, a $CF_3$ group, or an $OCF_3$ group, $L^{11}$ to $L^{14}$ each independently denote a single bond, —O—, —S—, —CO—, —CH$_2$O—, —OCH$_2$—, —CF$_2$O—, —OCF$_2$—, —CO—O—, —O—CO—, —CO—S—, —S—CO—, —O—CO—O—, —CH$_2$CH$_2$—, —CH=CH—, or —C≡C—, Y each independently denotes a single bond or a linear or branched alkylene group having 1 to 10 carbon atoms, one or two or more methylene groups in the alkylene group may be each independently substituted by —O—, —CO—, —COO—, or —OCO—, provided that the oxygen atoms are not directly bonded to each other, and one or two or more hydrogen atoms in the alkylene group may be each independently substituted by a halogen atom or an alkyl group having 1 to 9 carbon atoms, $a^1$, $b^1$, $c^1$, and $d^1$ are each independently an integer of 0 or 1, provided that $a^1+b^1+c^1+d^1$ is 1, 2, or 3, $d^1$ is 0 in the case where $a^1$ is 0, $c^1$ is 0 in the case where $a^1$ is 1, $a^1$ is 0 in the case where $c^1$ is 1, and $a^1=d^1=0$ in the case of $b^1=c^1=1$, and Cyclo each independently denotes a cycloalkane having 3 to 10 carbon atoms and may have a double bond.)

Liquid crystal compounds (LC-IV) and (LC-V) represented by the following general formulae are preferred.

fluorine atom, provided that $R^{11}$ and $R^{12}$ are not simultaneously a fluorine atom, one or two nonadjacent —$CH_2$— groups in the alkyl group may be substituted by —O—, —S—, —CO—, —CO—O—, —O—CO—, —CO—S—, —S—CO—, —O—CO—O—, —CH=CH—, —C≡C—, a cyclopropylene group, or —Si(CH$_3$)$_2$—, and one or more hydrogen atoms in the alkyl group may be substituted by a fluorine atom or a CN group, ring $A^1$ each denotes a 1,4-phenylene group or a 1,4-cyclohexylene group in which 1 to 4 hydrogen atoms may be substituted by a fluorine atom, a $CF_3$ group, an $OCF_3$ group, a CN group, or a plurality of these groups, ring $B^1$ denotes a 1,4-phenylene group in which 1 to 4 hydrogen atoms may be substituted by a fluorine atom, a $CF_3$ group, an $OCF_3$ group, a CN group, or a plurality of these groups, ring $C^1$ denotes a 1,4-cyclohexylene group in which 1 to 4 hydrogen atoms may be substituted by a fluorine atom, a $CF_3$ group, an $OCF_3$ group, a CN group, or a plurality of these groups, L each independently denotes a single bond, —O—, —S—, —CO—, —CH$_2$O—, —OCH$_2$—, —CF$_2$O—, —OCF$_2$—, —CO—O—, —O—CO—, —CO—S—, —S—CO—, —O—CO—O—, —CH$_2$CH$_2$—, —CH=CH—, or —C≡C—, Y each independently denotes a single bond or a linear or branched alkylene group having 1 to 10 carbon atoms, one or two or more methylene groups in the alkylene group may be each independently substituted by —O—, —CO—, —COO—, or —OCO—, provided that the oxygen atoms are not directly bonded to each other, and one or two or more hydrogen atoms in the alkylene group may be each independently substituted by a halogen atom or an alkyl group having 1 to 9 carbon atoms, and

[Chem. 5]

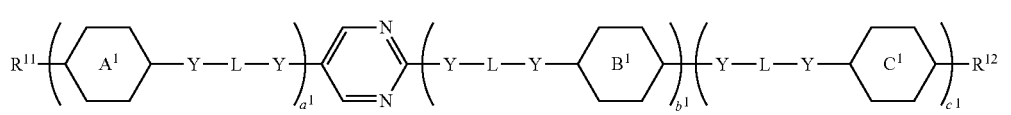

(wherein $R^{11}$ and $R^{12}$ each independently denote a linear or branched alkyl group having 1 to 18 carbon atoms or a $a^1$ is 0, 1, or 2, $b^1$ and $c^1$ are integers of 0, 1, or 2, and the total of $a^1$, $b^1$, and $c^1$ is 1, 2, or 3.)

[Chem. 6]

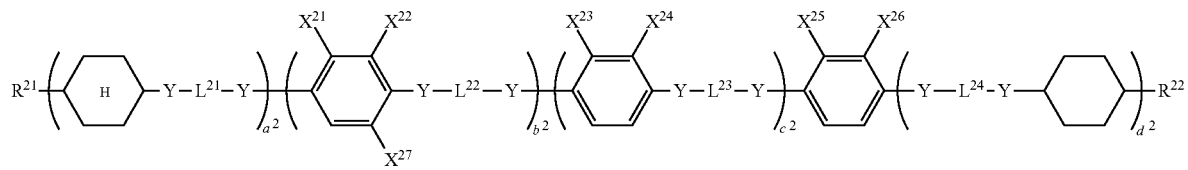

(LC-V)

(wherein $R^{21}$ and $R^{22}$ each independently denote a linear or branched alkyl group having 1 to 18 carbon atoms or a fluorine atom, provided that $R^{21}$ and $R^{22}$ are not simultaneously a fluorine atom, one or two nonadjacent —$CH_2$— groups in the alkyl group may be substituted by —O—, —S—, —CO—, —CO—O—, —O—CO—, —CO—S—, —S—CO—, —O—CO—O—, —CH═CH—, —C≡C—, a cyclopropylene group, or —Si$(CH_3)_2$—, and one or more hydrogen atoms in the alkyl group may be substituted by a fluorine atom or a CN group, $X^{21}$ to $X^{27}$ each independently denote a hydrogen atom, a fluorine atom, a $CF_3$ group, or an $OCF_3$ group, $L^{21}$ to $L^{24}$ each independently denote a single bond, —O—, —S—, —CO—, —$CH_2O$—, —$OCH_2$—, —$CF_2O$—, —$OCF_2$—, —CO—O—, —O—CO—, —CO—S—, —S—CO—, —O—CO—O—, —$CH_2CH_2$—, —CH═CH—, or —C≡C—, and $a^2$, $b^2$, $c^2$, and $d^2$ are each independently an integer of 0 or 1, provided that $a^2+b^2+c^2+d^2$ is 1, 2, or 3, $d^2$ is 0 in the case where $a^2$ is 0, $c^2$ is 0 in the case where $a^2$ is 1, and $a^2=d^2=0$ in the case of $b^2=c^2=1$.)

In phenylpyrimidine compounds, in order to form a tilted smectic phase required for ferroelectricity, to increase the tilt angle of the molecules, or to decrease the melting point, the molecular ring preferably has at least one fluorine atom, $CF_3$ group, or $OCF_3$ group as a substituent. The substituent is preferably fluorine, which has a small shape, in order to stabilize the liquid crystal phase and maintain high-speed responsivity. The number of the substituents preferably ranges from 1 to 3.

For high-speed response due to low viscosity, a linking group between rings (—Z—Y—Z— or —Y-L-Y—) is preferably selected from a single bond, —$CH_2O$—, —$OCH_2$—, —$CF_2O$—, —$OCF_2$—, —$CH_2CH_2$—, —CH═CH—, or —C≡C—, particularly preferably a single bond. A single bond is also preferred in order to suppress local polarization of the molecules and to reduce adverse effects on switching behavior. On the other hand, a material for maintaining the stability of a layer structure preferably has high viscosity. In this case, —CO—O—, —O—CO—, —CO—S—, or —S—CO— is preferably selected, and —CO—O— or —O—CO— is particularly preferably used.

In order to enhance the effect of lowering the melting point, one or both of the side chains (R, $R^{11}$, $R^{12}$, $R^{21}$, and $R^{22}$) are preferably hydrogen atoms, methyl groups, ethyl groups, propyl groups, pentyl groups, hexyl groups, heptyl groups, octyl groups, nonyl groups, isopropyl groups, alkylcarbonyloxy groups, alkyloxycarbonyl groups, or alkyloxycarbonyloxy groups.

A compound that is suitable to increase Δn, can form a stable ferroelectric liquid crystal phase, and is suitable for high-speed response due to low viscosity is preferably a liquid crystal compound (LC-VI) represented by the following general formula.

[Chem. 7]

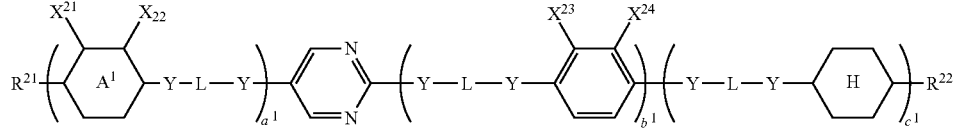

(LC-VI)

(wherein $R^{21}$ and $R^{22}$ each independently denote a linear or branched alkyl group having 1 to 18 carbon atoms, a hydrogen atom, or a fluorine atom, one or two nonadjacent —$CH_2$— groups in the alkyl group may be substituted by —O—, —S—, —CO—, —CO—O—, —O—CO—, —CO—S—, —S—CO—, —O—$SO_2$—, —$SO_2$—O—, —O—CO—O—, —CH═CH—, —C≡C—, a cyclopropylene group, or —Si$(CH_3)_2$—, and one or more hydrogen atoms in the alkyl group may be substituted by a fluorine atom, a chlorine atom, a bromine atom, or a CN group, $X^{21}$ to $X^{24}$ each independently denote a hydrogen atom, halogen, a cyano group, a methyl group, a methoxy group, a $CF_3$ group, or an $OCF_3$ group, ring $A^1$ denotes a phenylene group or a cyclohexylene group, L each independently denotes a single bond, —O—, —S—, —CO—, —$CH_2O$—, —$OCH_2$—, —$CF_2O$—, —$OCF_2$—, —CO—O—, —O—CO—, —CO—S—, —S—CO—, —O—CO—O—, —$CH_2CH_2$—, —CH═CH—, or —C≡C—, and $a^1$ is 0, 1, or 2, $b^1$ and $c^1$ are integers of 0, 1, or 2, the total of $a^1+b^1+c^1$ is 1 or 2, $c^1=0$ in the case of $a^1=1$, and $a^1=0$ in the case of $c^1=1$.)

Y in the general formulae (LC-I) to (LC-VI) preferably each independently denotes a single bond or an alkylene group having 1 to 7 carbon atoms (one or two or more methylene groups in the alkylene group may be each independently substituted by —O—, —CO—, —COO—, or —OCO—, provided that the oxygen atoms are not directly bonded to each other), more preferably each independently denotes a single bond or an alkylene group having 1 to 5 carbon atoms (one or two or more methylene groups in the alkylene group may be each independently substituted by —O—, —CO—, —COO—, or —OCO—, provided that the oxygen atoms are not directly bonded to each other), and more preferably each independently denotes a single bond or an alkylene group having 1 to 3 carbon atoms (one or two or more methylene groups in the alkylene group may be each independently substituted by —O—, —CO—, —COO—, or —OCO—, provided that the oxygen atoms are not directly bonded to each other).

A compound that is suitable for TFT driving, can form a stable ferroelectric liquid crystal phase, and is suitable for high-speed response due to low viscosity is particularly preferably a liquid crystal compound (LC-VII) represented by the following general formula.

[Chem. 8]

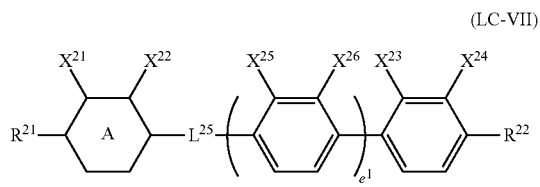

(LC-VII)

(wherein $e^1$ is 0 or 1, $X^{21}$ to $X^{26}$ each independently denote a hydrogen atom or a fluorine atom group, provided that at least one of $X^{21}$ to $X^{24}$ denotes a fluorine atom in the case where $e^1$ is 0, and at least one of $X^{21}$ to $X^{26}$ denotes a fluorine atom in the case where $e^1$ is 1, $R^{21}$ and $R^{22}$ each independently denote a linear or branched alkyl group having 1 to 18 carbon atoms, and one —CH$_2$— group in the alkyl group may be substituted by —O—, $L^{25}$ denotes a single bond, —CH$_2$O—, or —OCH$_2$—, and ring $A^1$ denotes a phenylene group or a cyclohexylene group.)

A liquid crystal compound for use in a ferroelectric liquid crystal composition according to the present invention may be a combination of one or two or more of (LC-0), (LC-I) to (LC-III), (LC-IV), (LC-V), (LC-VI), and (LC-VII).

<Liquid Crystal Composition Having Achiral Smectic C Phase>

A liquid crystal composition having an achiral smectic C phase for use in the present invention preferably has negative dielectric anisotropy, may be composed of a negative dielectric anisotropy compound alone, or may be composed of a negative dielectric anisotropy compound and a nonpolar compound not having dielectric anisotropy. In the case where achiral host liquid crystals (mother liquid crystals) are used, the achiral host liquid crystals can contain a racemate (state in which chirality is canceled) of a chiral compound described below, and a monomer for realizing polymer stabilization (polymerizable compound) may be added to the achiral host liquid crystals. This is used to facilitate uniaxial alignment and to allow the liquid crystals to respond to an electric field utilizing negative dielectric anisotropy and spontaneous polarization.

In the case where liquid crystals are driven utilizing negative dielectric anisotropy, a chiral compound to be added is preferably a compound only having chirality that creates little disturbance of uniaxial alignment and does not induce spontaneous polarization. In the case where liquid crystals are driven utilizing polarization switching force of spontaneous polarization, the host liquid crystals do not necessarily have negative dielectric anisotropy, and a ferroelectric chiral compound is preferably added to the host liquid crystals. Liquid crystals may also be driven utilizing negative dielectric anisotropy and polarization switching force in combination. It is also preferable to add a chiral compound that can induce ferroelectricity to host liquid crystals having negative dielectric anisotropy. It is desirable that the helix of the liquid crystal composition be substantially completely loosened by a racemate. Such a liquid crystal composition having a SmC or SmC* phase can be homeotropically aligned in response to an applied voltage and can be used in a liquid crystal element according to the present invention.

As illustrated in FIGS. 1A and 1B, when an electric field generally parallel to a substrate face is applied to liquid crystal molecules aligned generally perpendicular to the substrate face, C-directors can be rotated by a high-speed Goldstone mode to modulate light transmittance while the liquid crystal molecules are aligned generally perpendicular to the substrate face. In the present invention, the achiral smectic C phase includes not only the case where a liquid crystal composition having a smectic C phase contains no chiral compound or contains a chiral compound as a racemate but also the case where the amount of added chiral compound is small or substantially cancelled and the enantiomer excess (ee) is small enough not to exhibit ferroelectricity.

In order to fix the state of liquid crystals aligned, for example, using an alignment film without alignment defects, like the case where no monomer is added, it is preferable to at least induce a phase transition from a nematic phase to a smectic phase by cold removal, and more preferably a liquid crystal cell has a flat substrate face. Furthermore, it is necessary to polymerize the monomer in a liquid crystal phase, such as a nematic phase or a smectic phase, such that the monomer has a network or dispersed state. Furthermore, in order to prevent the formation of a phase separation structure, it is preferable to decrease the monomer content and adjust the polymer precursor content or the precursor composition such that a network polymer can be formed between liquid crystal molecules while liquid crystals are aligned. In the case of photopolymerization, it is preferable to adjust the UV exposure time, UV exposure intensity, and temperature so as to form a network polymer without liquid-crystal alignment defects.

<Chiral Compound>

A chiral compound contained in a ferroelectric liquid crystal composition according to the present invention may be a compound having an asymmetric atom, a compound having axial chirality, a compound having planar chirality, or an atropisomer. The chiral compound may or may not have a polymerizable group.

In a compound having an asymmetric atom, the asymmetric atom is preferably an asymmetric carbon atom because steric inversion is difficult to occur. The asymmetric atom may be a heteroatom. The asymmetric atom may be introduced into part of a chain structure or a ring structure.

In the ferroelectric liquid crystal composition, the compound having an asymmetric atom is preferably an optically active compound represented by the general formula (IV).

[Chem. 9]

$$R^1\text{-}A^1\text{-}(\text{-}Z\text{-}A^2\text{-})_m R^2 \qquad (IV)$$

(In the formula (IV), $R^1$ and $R^2$ each independently denote a linear or branched alkyl group having 1 to 30 carbon atoms, a hydrogen atom, or a fluorine atom, one or two or more nonadjacent —$CH_2$— groups in the alkyl group may be substituted by —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—, one or more hydrogen atoms in the alkyl group may be substituted by a fluorine atom, a chlorine atom, a bromine atom, or a CN group, or may have a polymerizable group, the alkyl group may have a condensed or spirocyclic system, the alkyl group may have one or two or more aromatic or aliphatic rings that can contain one or two or more heteroatoms, and these rings may be substituted by an alkyl group, an alkoxy group, or halogen, one or both of $R^1$ and $R^2$ are a group having an asymmetric atom, Z each independently denotes —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond, and $R^a$ in —CO—N($R^a$)— or —N($R^a$)—CO— denotes a hydrogen atom or a linear or branched alkyl group having 1 to 4 carbon atoms, $A^1$ and $A^2$ each independently denote a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, or an indandiyl group, one or two or more —CH= groups in the ring(s) of the phenylene group, naphthalenediyl group, tetrahydronaphthalenediyl group, or indandiyl group may be substituted by a nitrogen atom, one or two nonadjacent —$CH_2$— groups in the ring(s) of the cyclohexylene group, dioxolanediyl group, cyclohexenylene group, bicyclo[2.2.2]octylene group, piperidinediyl group, decahydronaphthalenediyl group, tetrahydronaphthalenediyl group, or indandiyl group may be substituted by —O— and/or —S—, and one or more hydrogen atoms of the cyclic group may be substituted by a fluorine atom, a chlorine atom, a bromine atom, a CN group, a $NO_2$ group, an alkyl group, an alkoxy group, an alkylcarbonyl group, or an alkoxycarbonyl group, the alkyl group, alkoxy group, alkylcarbonyl group, or alkoxycarbonyl group each having 1 to 7 carbon atoms, one or two or more hydrogen atoms of the alkyl group, alkoxy group, alkylcarbonyl group, or alkoxycarbonyl group being optionally substituted by a fluorine atom or a chlorine atom, and m is 1, 2, 3, 4, or 5.)

A dichiral compound represented by the general formula (IV) in which both $R^1$ and $R^2$ are chiral groups are more preferred. Specific examples of the dichiral compound include compounds represented by the following general formulae (IV-a1) to (IV-a11).

[Chem. 10]

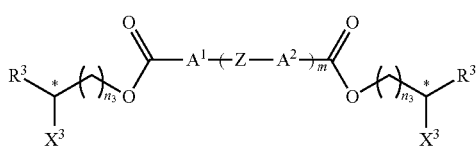

(IV-a1)

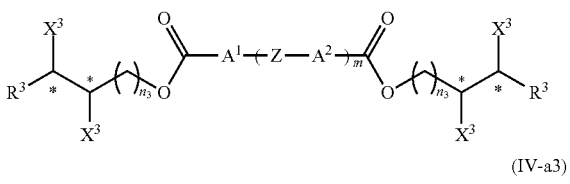

(IV-a2)

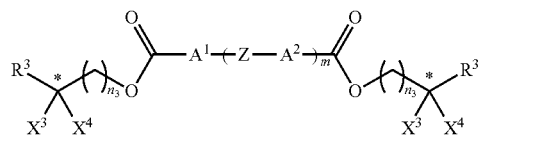

(IV-a3)

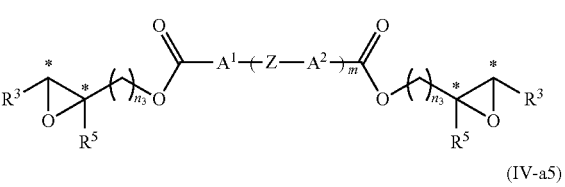

(IV-a4)

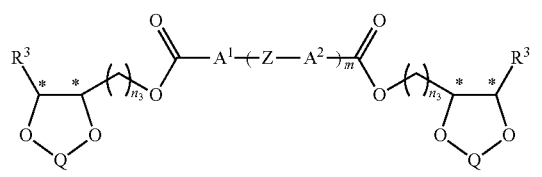

(IV-a5)

[Chem. 11]

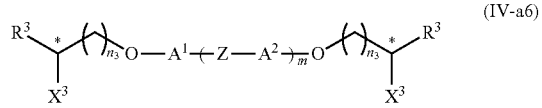

(IV-a6)

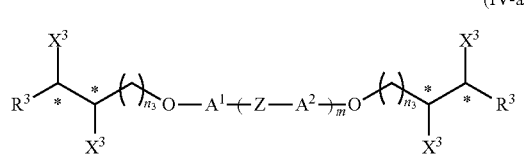

(IV-a7)

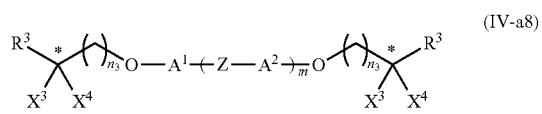

(IV-a8)

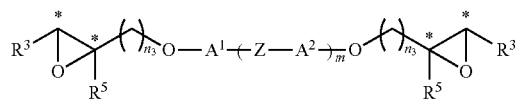

(IV-a9)

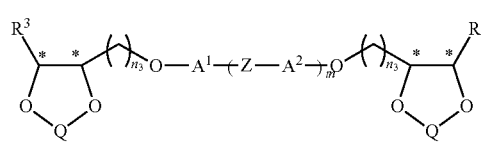

(IV-a10)

[Chem. 12]

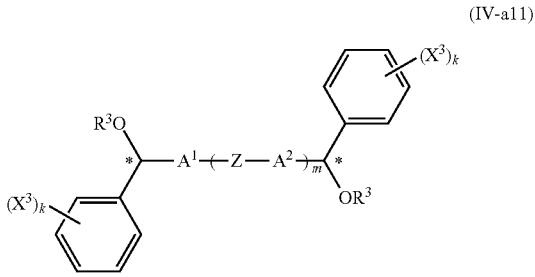

(IV-a11)

In the general formulae (IV-a1) to (IV-a11), $R^3$ each independently denotes a linear or branched alkyl group having 1 to 10 carbon atoms, one or two or more nonadjacent —$CH_2$— groups in the alkyl group may be substituted by —O—, —S—, —NH—, —N($CH_3$)—, —CO—, —CO—O—, O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—, and one or more hydrogen atoms in the alkyl group may be substituted by a fluorine atom, a chlorine atom, a bromine atom, or a CN group, or may have a polymerizable group. The polymerizable group may be a vinyl group, an allyl group, or a (meth)acryloyl group.

$X^3$ and $X^4$ are preferably a halogen atom (F, Cl, Br, or I), a cyano group, a phenyl group (one or two or more hydrogen atoms of the phenyl group may be substituted by a halogen atom (F, Cl, Br, or I), a methyl group, a methoxy group, —$CF_3$, or —$OCF_3$), a methyl group, a methoxy group, —$CF_3$, or —$OCF_3$. In the general formulae (IV-a3) and (IV-a8), when an asymmetric atom is disposed at positions marked with *, $X^4$ and $X^3$ are different groups.

$n_3$ is an integer in the range of 0 to 20.

$R^5$ in the general formulae (IV-a4) and (IV-a9) is preferably a hydrogen atom or a methyl group.

Q in the general formulae (IV-a5) and (IV-a10) may be a divalent hydrocarbon group, such as a methylene group, an isopropylidene group, or a cyclohexylidene group.

k in the general formula (IV-a11) is an integer in the range of 0 to 5.

More preferably, $R^3$ may be a linear or branched alkyl groups having 4 to 8 carbon atoms, such as $C_4H_9$, $C_6H_{13}$, or $C_8H_{17}$. $X^3$ is preferably $CH_3$.

A partial structural formula -$A^1$-(Z-$A^2$)$_m$- in the general formulae (IV) and (IV-a1) to (IV-a11) is more preferably the following general formula (IV-b), still more preferably (IV-b1) to (IV-b6).

[Chem. 13]

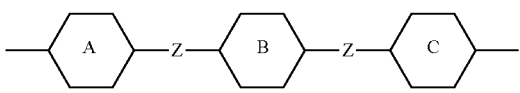

(IV-b)

(wherein rings A, B, and C each independently denote a phenylene group, a cyclohexylene group, or a naphthalenediyl group, one or two or more hydrogen atoms of a benzene ring in these groups may be substituted by a halogen atom (F, Cl, Br, or I), a methyl group, a methoxy group, —$CF_3$, or —$OCF_3$, and one or two or more carbon atoms of a benzene ring may be substituted by a nitrogen atom. Z denotes the same as in the formula (IV).)

[Chem. 14]

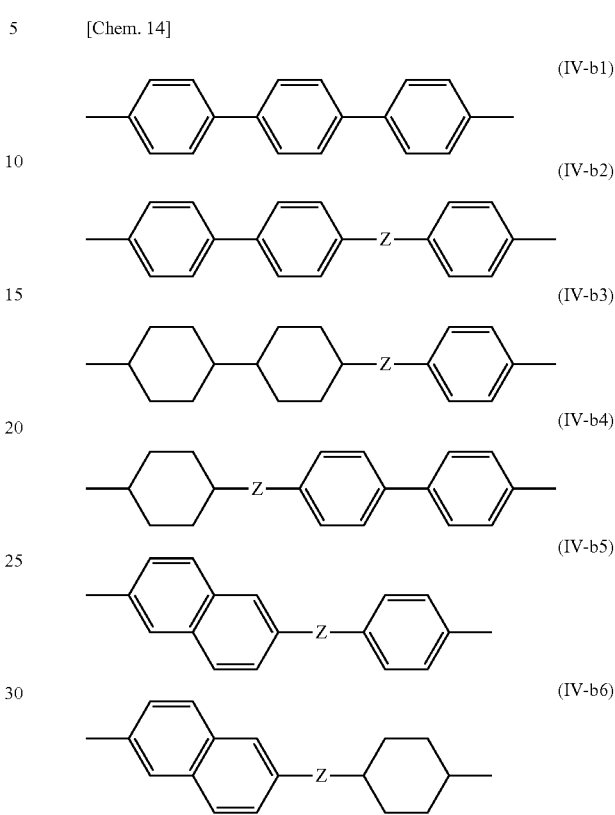

(In these formulae, one or two or more hydrogen atoms of a benzene ring may be substituted by a halogen atom (F, Cl, Br, or I), a methyl group, a methoxy group, —$CF_3$, or —$OCF_3$, and one or two or more carbon atoms of a benzene ring may be substituted by a nitrogen atom. Z denotes the same as in the formula (IV).) In order to increase the liquid crystal temperature range and to decrease the melting point, a compound having a heterocycle, such as a pyridine ring or a pyrimidine ring, is preferably used. In this case, the compound has relatively high polarizability. In the case of a hydrocarbon ring, such as a benzene ring or a cyclohexane ring, the compound has low polarizability. Thus, the content is preferably appropriately adjusted to the polarizability of the chiral compound.

A chiral compound for use in a ferroelectric liquid crystal composition according to the present invention may be a compound having axial chirality or an atropisomer.

Axial chirality occurs in a compound having hindered rotation about its bond axis, such as an allene derivative or a biphenyl derivative described below, when substituents $X^a$ and $Y^a$ at one end of the axis are different, and substituents $X^b$ and $Y^b$ at the other end are different.

[Chem. 15]

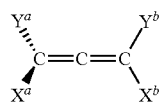

[Chem. 16]

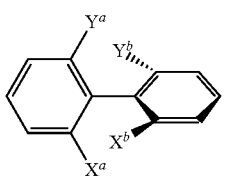

The case where rotation about a bond axis is hindered by steric hindrance as in biphenyl derivatives is referred to as atropisomerism.

Examples of the compound having axial chirality for use in a ferroelectric liquid crystal composition according to the present invention include compounds represented by the following general formulae (IV-c1) and (IV-c2).

[Chem. 17]

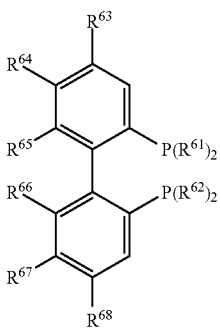
(IV-c1)

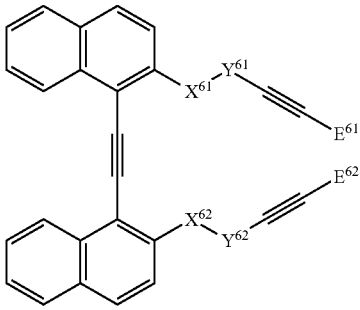
(IV-c2)

In the formulae (IV-c1) and (IV-c2), at least one of $X^{61}$ and $Y^{61}$ and at least one of $X^{62}$ and $Y^{62}$ are present, and $X^{61}$, $X^{62}$, $Y^{61}$, and $Y^{62}$ each independently denote $CH_2$, $C=O$, O, N, S, P, B, or Si. N, P, B, or Si may be bonded to a substituent, for example, an alkyl group, an alkoxy group, or an acyl group, so as to satisfy necessary valence.

$E^{61}$ and $E^{62}$ each independently denote a hydrogen atom, an alkyl group, an aryl group, an allyl group, a benzyl group, an alkenyl group, an alkynyl group, an alkyl ether group, an alkyl ester group, an alkylketone group, a heterocyclic group, or a derivative thereof.

In the formula (IV-c1), $R^{61}$ and $R^{62}$ each independently denote a phenyl group optionally substituted by an alkyl group, an alkoxy group, or a halogen atom, a cyclopentyl group, or a cyclohexyl group, $R^{63}$, $R^{64}$, $R^{65}$, $R^{66}$, $R^{67}$, and $R^{68}$ each independently denote a hydrogen atom, an alkyl group, an alkoxy group, an acyloxy group, a halogen atom, a haloalkyl group, or a dialkylamino group, two of $R^{63}$, $R^{64}$, and $R^{65}$ may form an optionally substituted methylene chain or an optionally substituted mono- or polymethylenedioxy group, and two of $R^{66}$, $R^{67}$, and $R^{68}$ may form an optionally substituted methylene chain or an optionally substituted mono- or polymethylenedioxy group, provided that $R^{65}$ and $R^{66}$ are not simultaneously a hydrogen atom.

A chiral compound for use in a ferroelectric liquid crystal composition according to the present invention may be a compound having planar chirality. Examples of the compound having planar chirality include helicene derivatives represented by the following (IV-c3).

[Chem. 18]

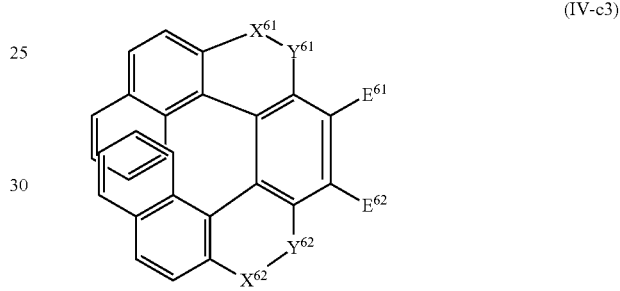
(IV-c3)

(In the formula, at least one of $X^{61}$ and $Y^{61}$ and at least one of $X^{62}$ and $Y^{62}$ are present, and $X^{61}$, $X^{62}$, $Y^{61}$, and $Y^{62}$ each independently denote $CH_2$, $C=O$, O, N, S, P, B, or Si. N, P, B, or Si may be bonded to a substituent, for example, an alkyl group, an alkoxy group, or an acyl group, so as to satisfy necessary valence.

$E^{61}$ and $E^{62}$ each independently denote a hydrogen atom, an alkyl group, aryl group, an allyl group, a benzyl group, an alkenyl group, an alkynyl group, an alkyl ether group, an alkyl ester group, an alkylketone group, a heterocyclic group, or a derivative thereof.)

Because the overlapping relationship between overlapping rings in such a helicene derivative cannot be altered, rings having a clockwise helical structure are distinguished from rings having a counterclockwise helical structure. Thus, the helicene derivative has chirality.

A chiral compound contained in a liquid crystal composition is preferably a compound having high helical twisting power such that the pitch of the helical structure is decreased. The amount of such a compound required for the desired pitch can be decreased with increasing helical twisting power. Thus, a compound having higher helical twisting power is preferred because the increase in driving voltage can be suppressed. In this respect, examples of preferred chiral compounds include compounds having an asymmetric atom (IV-d1) to (IV-d3) and compounds having axial chirality (IV-d4) to (IV-d5).

[Chem. 19]

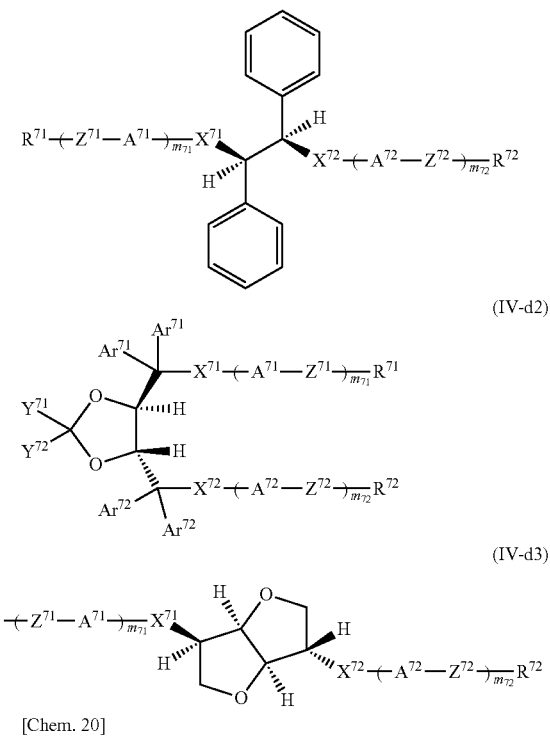

(IV-d1)

(IV-d2)

(IV-d3)

[Chem. 20]

(IV-d4)

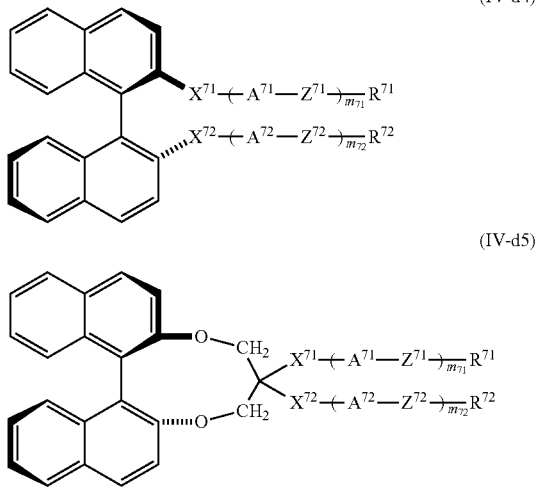

(IV-d5)

In the formulae (IV-d1) to (IV-d5), $R^{71}$ and $R^{72}$ each independently denote hydrogen, halogen, a cyano (CN) group, an isocyanate (NCO) group, an isothiocyanate (NCS) group, or an alkyl group having 1 to 20 carbon atoms, and one or two or more —$CH_2$— in the alkyl group may be substituted by —O—, —S—, —COO—, —OCO—, —CH=CH—, —CF=CF—, or —C≡C—, and hydrogen in the alkyl may be substituted by halogen, $A^{71}$ and $A^{72}$ each independently denote an aromatic or non-aromatic 3- to 8-membered ring or a condensed ring having 9 or more carbon atoms, hydrogen of these rings may be substituted by halogen or an alkyl or haloalkyl group having 1 to 3 carbon atoms, one or two or more —$CH_2$— of the rings may be substituted by —O—, —S—, or —NH—, and one or two or more —CH= of the rings may be substituted by —Na, $Z^{71}$ and $Z^{72}$ each independently denote a single bond or an alkylene group having 1 to 8 carbon atoms, wherein —$CH_2$— may be substituted by —O—, —S—, —COO—, —OCO—, —CSO—, —OCS—, —N=N—, —CH=N—, —N=CH—, —N(O)=N—, —N=N(O)—, —CH=CH—, —CF=CF—, or —C≡C—, and hydrogen may be substituted by halogen, $X^{71}$ and $X^{72}$ each independently denote a single bond, —COO—, —OCO—, —$CH_2$O—, —O$CH_2$—, —$CF_2$O—, —OC$F_2$—, or —$CH_2CH_2$—, and $m_{71}$ and $m_{72}$ are each independently an integer in the range of 1 to 4. Either $m_{71}$ or $m_{72}$ in the formula (IV-d5) may be 0.

In the formula (IV-d2), $Ar^{71}$ and $Ar^{72}$ each independently denote a phenyl group or a naphthyl group, and one or two or more hydrogen atoms of a benzene ring in these groups may be substituted by a halogen atom (F, Cl, Br, or I), a methyl group, a methoxy group, —$CF_3$, or —$OCF_3$.

In a ferroelectric liquid crystal composition according to the present invention, a mesogenic chiral compound may be used. Examples of such chiral compounds include:

[Chem. 21]

$$R^{81}\!-\!(\!A^{81}\!-\!Z^{81}\!)_{\overline{m}_{81}}\!X^{81}\!-\!CH^{*81}\!-\!X^{82}\!-\!(\!Z^{82}\!-\!A^{82}\!)_{\overline{m}_{82}}\!R^{82} \quad (IV\text{-}e1)$$

$$R^{81}\!-\!(\!A^{81}\!-\!Z^{81}\!)_{\overline{m}_{81}}\!\overset{Y^{81}}{\underset{Z^{85}}{\overset{Z^{84}}{<}}}\!CH^{*82} \quad (IV\text{-}e2)$$

$$R^{81}\!-\!(\!A^{81}\!-\!Z^{81}\!)_{\overline{m}_{81}}\!X^{81}\!-\!CH^{*83}\!\underset{X^{83}\!-\!(\!Z^{83}\!-\!A^{83}\!)_{\overline{m}_{83}}\!R^{83}}{\overset{-X^{82}\!-\!(\!Z^{82}\!-\!A^{82}\!)_{\overline{m}_{82}}\!R^{82}}{<}} \quad (IV\text{-}e3)$$

In the formula (IV-e1) to (IV-e3), $R^{81}$, $R^{82}$, $R^{83}$, and $Y^{81}$ each independently denote a linear or branched alkyl group having 1 to 30 carbon atoms, a hydrogen atom, or a fluorine atom, one or two or more nonadjacent —$CH_2$— groups in the alkyl group may be substituted by —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—, one or more hydrogen atoms in the alkyl group may be substituted by a fluorine atom, a chlorine atom, a bromine atom, or a CN group, or may have a polymerizable group, the alkyl group may have a condensed or spirocyclic system, the alkyl group may have one or two or more aromatic or aliphatic rings that can contain one or two or more heteroatoms, and these rings may be substituted by an alkyl group, an alkoxy group, or halogen, $Z^{81}$, $Z^{82}$, $Z^{83}$, $Z^{84}$, and $Z^{85}$ each independently denote an alkylene group having 1 to 40 carbon atoms, and one or two or more $CH_2$ groups of the alkyl group may be substituted by —O—, —S—, —NH—, —N($CH_3$)—, —CO—, —COO—, —OCO—, —OCOO—, —S—CO—, —CO—S—, —CH=CH—, —CH=CF—, —CF=CH—, —CF=CF—, —$CF_2$—, or —C≡C—, $X^{81}$, $X^{82}$, and $X^{83}$ each independently denote —O—, —S—, —CO—, —COO—, —OCO—, —OCOO—, —CO—NH—, —NH—CO—, —$CH_2CH_2$—, —OC$H_2$—, —CH$_2$O—, —SCH$_2$—, —CH$_2$S—, —CF=CF—, —CH=CH—, —OCO—CH=CH—, —C≡C—, or a single bond, A$^{81}$, A$^{82}$, and A$^{83}$ each independently denote a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, or an indandiyl group, one or two or more —CH= groups in the ring(s) of the phenylene group, naphthalenediyl group, tetrahydronaphthalenediyl group, or indandiyl group may be substituted by a nitrogen atom, one or two nonadjacent —CH$_2$— groups in the ring(s) of the cyclohexylene group, dioxolanediyl group, cyclohexenylene group, bicyclo[2.2.2]octylene group, piperidinediyl group, decahydronaphthalenediyl group, tetrahydronaphthalenediyl group, or indandiyl group may be substituted by —O— and/or —S—, and one or more hydrogen atoms of the cyclic group may be substituted by a fluorine atom, a chlorine atom, a bromine atom, a CN group, a NO$_2$ group, an alkyl group, an alkoxy group, an alkylcarbonyl group, or an alkoxycarbonyl group, the alkyl group, alkoxy group, alkylcarbonyl group, or alkoxycarbonyl group each having 1 to 7 carbon atoms, one or two or more hydrogen atoms of the alkyl group, alkoxy group, alkylcarbonyl group, or alkoxycarbonyl group being optionally substituted by a fluorine atom or a chlorine atom, and m$_{81}$, m$_{82}$, and m$_{83}$ are 0 or 1, and m$_{81}$+m$_{82}$+m$_{83}$ is 1, 2, or 3.

CH*$^{81}$ and CH*$^{82}$ each independently denote a chiral divalent group, and CH*$^{83}$ denotes a chiral trivalent group.

The chiral divalent group of CH*$^{81}$ and CH*$^{82}$ is preferably the following divalent group having an asymmetric atom or the following divalent group having axial chirality.

[Chem. 22]

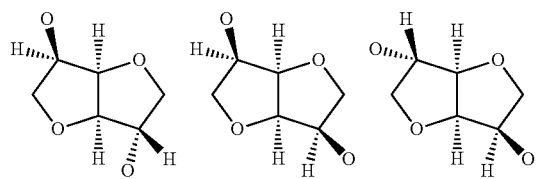

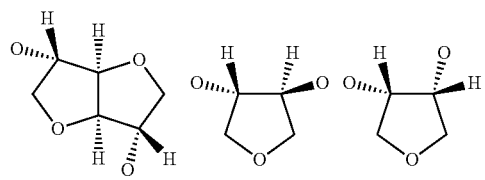

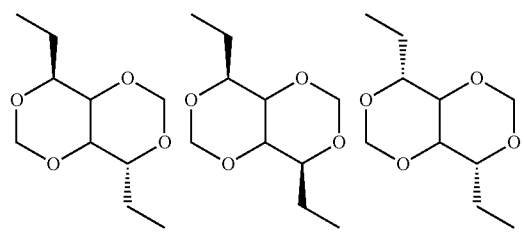

[Chem. 23]

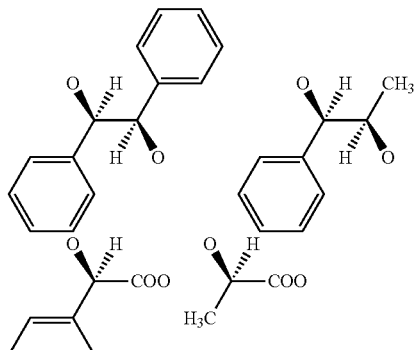

[Chem. 24]

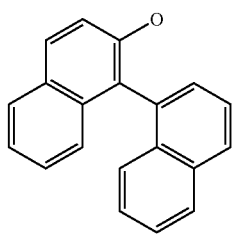

In these divalent groups of CH*$^{81}$ and CH*$^{82}$, one or two or more hydrogen atoms of a benzene ring may be substituted by a halogen atom (F, Cl, Br, or I), a methyl group, a methoxy group, —CF$_3$, or —OCF$_3$, and one or two or more carbon atoms of a benzene ring may be substituted by a nitrogen atom.

The chiral trivalent group of CH*$^{83}$ may be formed by combining the chiral divalent group of CH*$^{81}$ and CH*$^{82}$ with —X$^{83}$(Z$^{83}$A$^{83}$)m$_{82}$R$^{83}$.

More preferred is the following compound having an isosorbide skeleton as a chiral divalent group.

[Chem. 25]

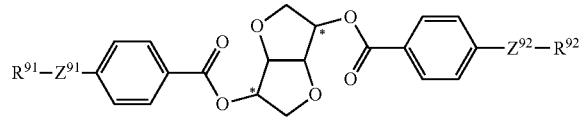

wherein R$^{91}$ and R$^{92}$ each independently denote a linear or branched alkyl group having 1 to 30 carbon atoms, a hydrogen atom, or a fluorine atom, one or two or more nonadjacent —CH$_2$— groups in the alkyl group may be substituted by —O—, —S—, —NH—, N(CH$_3$), —CO—, —CO—O—, —O—CO—, —O—CO—O—, —S—CO—, —CO—S—, —O—SO$_2$—, —SO$_2$—O—, —CH=CH—, —C≡C—, a cyclopropylene group, or —Si(CH$_3$)$_2$—, one or more hydrogen atoms in the alkyl group may be substituted by a fluorine atom, a chlorine atom, a bromine atom, or a CN group, or may have a polymerizable group, the alkyl group may have a condensed or spirocyclic system, the alkyl group may have one or two or more aromatic or aliphatic rings that can contain one or two or more heteroatoms, and these rings may be substituted by an alkyl group, an alkoxy group, or halogen, and Z$^{91}$ and Z$^{92}$ each independently denote —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—CO—O—, —O—CO—CH=CH—, or a single bond, and R$^a$ in —CO—N(R$^a$)— or —N(R$^a$)—CO— denotes a hydrogen atom or a linear or branched alkyl group having 1 to 4 carbon atoms.

<Polymerizable Compound>

A polymerizable compound may be added to a ferroelectric liquid crystal composition according to the present invention to produce a polymer-stabilized liquid crystal composition.

<Polymerizable Compound (I)>

A polymerizable compound (I) for use in a ferroelectric liquid crystal composition according to the present invention is preferably a polymerizable compound represented by the general formula (I-a) or (I-b).

[Chem. 26]

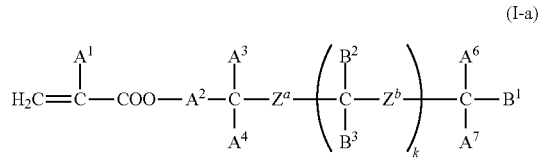

(I-a)

(In the formula (I-a),

A$^1$ denotes a hydrogen atom or a methyl group,

A$^2$ denotes a single bond or an alkylene group having 1 to 15 carbon atoms (one or two or more methylene groups in the alkylene group may be each independently substituted by an oxygen atom, —CO—, —COO—, or —OCO—, provided that the oxygen atoms are not directly bonded to each other, and one or two or more hydrogen atoms in the alkylene group may be each independently substituted by a fluorine atom, a methyl group, or an ethyl group), A$^3$ and A$^6$ each independently denote a hydrogen atom or an alkyl group having 1 to 18 carbon atoms (one or two or more methylene groups in the alkyl group may be each independently substituted by an oxygen atom, —CO—, —COO—, or —OCO—, provided that the oxygen atoms are not directly bonded to each other, and one or two or more hydrogen atoms in the alkyl group may be each independently substituted by a halogen atom or an alkyl group having 1 to 17 carbon atoms), A$^4$ and A$^7$ each independently denote a hydrogen atom or an alkyl group having 1 to 10 carbon atoms (one or two or more methylene groups in the alkyl group may be each independently substituted by an oxygen atom, —CO—, —COO—, or —OCO—, provided that the oxygen atoms are not directly bonded to each other, and one or two or more hydrogen atoms in the alkyl group may be each independently substituted by a halogen atom or an alkyl group having 1 to 9 carbon atoms), k denotes 1 to 40, and Z$^a$ and Z$^b$ denote a single bond, —CO—, —COO—, or —OCO—, and B$^1$, B$^2$, and B$^3$ each independently denote a hydrogen atom or a linear or branched alkyl group having 1 to 10 carbon atoms (one or two or more methylene groups in the alkyl group may be each independently substituted by an oxygen atom, —CO—, —COO—, or —OCO—, provided that the oxygen atoms are not directly bonded to each other).

[Chem. 27]

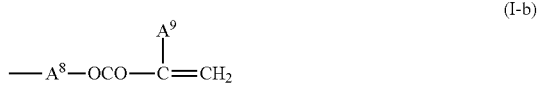

(I-b)

(In the formula (I-b), A$^9$ denotes a hydrogen atom or a methyl group, and

A$^8$ denotes a single bond or an alkylene group having 1 to 15 carbon atoms (one or two or more methylene groups in the alkylene group may be each independently substituted by an oxygen atom, —CO—, —COO—, or —OCO—, provided that the oxygen atoms are not directly bonded to each other, and one or two or more hydrogen atoms in the alkylene group may be each independently substituted by a fluorine atom, a methyl group, or an ethyl group). Among (2k+1) B$^1$, B$^2$, and B$^3$, the number of groups represented by the general formula (I-b) ranges from 0 to 3.) A polymer of the polymerizable compound preferably has a glass transition temperature in the range of −100° C. to 25° C.

Unless otherwise specified, the term "alkylene group", as used herein, refers to a structure in which one hydrogen atom is removed from a carbon atom at each end of an aliphatic linear hydrocarbon, that is, a divalent group "—(CH$_2$)$_n$—" (n is an integer of 1 or more). The substitution of a halogen atom or an alkyl group for the hydrogen atom or the substitution of an oxygen atom, —CO—, —COO—, or —OCO— for a methylene group will be specified in each case. The term "alkylene chain length" refers to n in the general formula "—(CH$_2$)$_n$—" of an "alkylene group".

A non-liquid-crystal monomer (I) may contain a plurality of polymerizable compounds represented by the general formula (I-a) having different main chain lengths or alkyl side chain lengths.

A preferred structure of a polymerizable compound (I) represented by the general formula (I-a) may be one or more selected from the group consisting of compounds represented by the following general formula (I-c), compounds represented by the general formula (I-d), compounds represented by the general formula (I-e), and compounds represented by the general formula (I-f).

[Chem. 28]

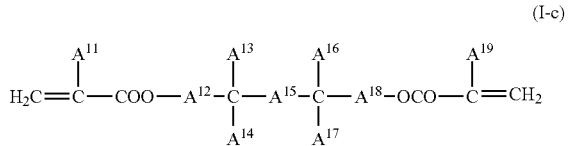

(I-c)

(In the formula (I-c), A$^{11}$ and A$^{19}$ each independently denote a hydrogen atom or a methyl group, A$^{12}$ and A$^{18}$ each independently denote a single bond or an alkylene group having 1 to 15 carbon atoms (one or two or more methylene groups in the alkylene group may be each independently substituted by an oxygen atom, —CO—, —COO—, or —OCO—, provided that the oxygen atoms are not directly bonded to each other, and one or two or more hydrogen atoms in the alkylene group may be each independently substituted by a fluorine atom, a methyl group, or an ethyl group), A$^{13}$ and A$^{16}$ each independently denote a linear alkyl group having 2 to 20 carbon atoms (one or two or more methylene groups in the linear alkyl group may be each independently substituted by an oxygen atom, —CO—, —COO—, or —OCO—, provided that the oxygen atoms are not directly bonded to each other), $A^{14}$ and $A^{17}$ each independently denote a hydrogen atom or an alkyl group having 1 to 10 carbon atoms (one or two or more methylene groups in the alkyl group may be each independently substituted by an oxygen atom, —CO—, —COO—, or —OCO—, provided that the oxygen atoms are not directly bonded to each other, and one or two or more hydrogen atoms in the alkyl group may be each independently substituted by a halogen atom or an alkyl group having 1 to 9 carbon atoms), $A^{15}$ denotes an alkylene group having 9 to 16 carbon atoms. (In at least 1 or more and 5 or less methylene groups in the alkylene group, one of the hydrogen atoms in the methylene group is each independently substituted by a linear or branched alkyl group having 1 to 10 carbon atoms. One or two or more methylene groups in the alkylene group may be each independently substituted by an oxygen atom, —CO—, —COO—, or —OCO—, provided that the oxygen atoms are not directly bonded to each other.))

[Chem. 29]

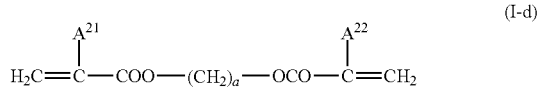

(I-d)

(In the formula (I-d), $A^{21}$ and $A^{22}$ each independently denote a hydrogen atom or a methyl group, and a is an integer in the range of 6 to 22.)

[Chem. 30]

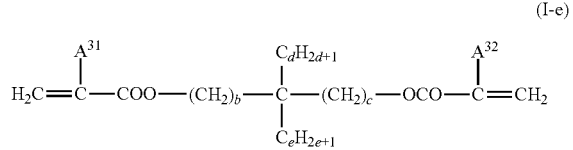

(I-e)

(In the formula (I-e), $A^{31}$ and $A^{32}$ each independently denote a hydrogen atom or a methyl group, b and c are each independently an integer in the range of 1 to 10, d is an integer in the range of 1 to 10, and e is an integer in the range of 0 to 6.)

[Chem. 31]

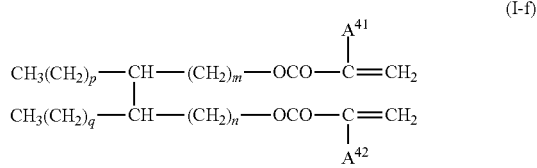

(I-f)

(In the formula (I-f), $A^{41}$ and $A^{42}$ each independently denote a hydrogen atom or a methyl group, and m, n, p, and q are each independently an integer in the range of 1 to 10.) Among these, a compound represented by the formula (I-c) is preferably contained.

In a preferred structure of a polymerizable compound represented by the general formula (I-c), both $A^{11}$ and $A^{19}$ are preferably a hydrogen atom. Although the advantages of the present invention can be achieved using a compound in which these substituents $A^{11}$ and $A^{19}$ are methyl groups, a compound in which these substituents $A^{11}$ and $A^{19}$ are hydrogen atoms advantageously has a higher rate of polymerization.

$A^{12}$ and $A^{18}$ each independently denote a single bond or an alkylene group having 1 to 3 carbon atoms. The distance between two polymerizable functional groups can be adjusted by independently changing the length of the number of carbon atoms in $A^{12}$ and $A^{18}$ and in $A^{15}$. A compound represented by the general formula (I-c) characteristically has a long distance between polymerizable functional groups (distance between cross-linking sites). However, an excessively long distance results in an excessively low rate of polymerization and adversely affects phase separation. Thus, there is an upper limit to the distance between polymerizable functional groups. A distance between two side chains $A^{13}$ and $A^{16}$ also has an influence on the mobility of the main chain. A short distance between $A^{13}$ and $A^{16}$ results in interference between the side chains $A^{13}$ and $A^{16}$ and decreased mobility. The distance between polymerizable functional groups of a compound represented by the general formula (I-c) depends on the sum of $A^{12}$, $A^{18}$, and $A^{15}$. $A^{15}$ rather than $A^{12}$ and $A^{18}$ is preferably extended.

On the other hand, in side chains $A^{13}$, $A^{14}$, $A^{16}$, and $A^{17}$, the lengths of these side chains preferably have the following aspect.

In the general formula (I-c), when $A^{13}$ and $A^{14}$ bonded to the same carbon atom of the main chain have different lengths, a longer side chain is referred to as $A^{13}$ (in the case where $A^{13}$ and $A^{14}$ have the same length, one of them is referred to as $A^{13}$). Likewise, when $A^{16}$ and $A^{17}$ have different lengths, a longer side chain is referred to as $A^{16}$ (in the case where $A^{16}$ and $A^{17}$ have the same length, one of them is referred to as $A^{16}$).

In the present application, $A^{13}$ and $A^{16}$ each independently denote a linear alkyl group having 2 to 20 carbon atoms (one or two or more methylene groups in the linear alkyl group may be each independently substituted by an oxygen atom, —CO—, —COO—, or —OCO—, provided that the oxygen atoms are not directly bonded to each other).

Preferably, $A^{13}$ and $A^{16}$ each independently denote a linear alkyl group having 2 to 18 carbon atoms (one or two or more methylene groups in the linear alkyl group may be each independently substituted by an oxygen atom, —CO—, —COO—, or —OCO—, provided that the oxygen atoms are not directly bonded to each other).

More preferably, $A^{13}$ and $A^{16}$ each independently denote a linear alkyl group having 3 to 15 carbon atoms (one or two or more methylene groups in the linear alkyl group may be each independently substituted by an oxygen atom, —CO—, —COO—, or —OCO—, provided that the oxygen atoms are not directly bonded to each other).

Side chains, which have higher mobility than the main chain, contribute to improved mobility of the polymer chain at low temperature. As described above, however, spatial interference between two side chains decreases mobility. In order to prevent spatial interference between side chains, it is effective to increase the distance between the side chains and to decrease the side chain length to the extent necessary.

In the present application, $A^{14}$ and $A^{17}$ each independently denote a hydrogen atom or an alkyl group having 1 to 10 carbon atoms (one or two or more methylene groups in the alkyl group may be each independently substituted by an oxygen atom, —CO—, —COO—, or —OCO—, provided that the oxygen atoms are not directly bonded to each other, and one or two or more hydrogen atoms in the alkyl group may be each independently substituted by a halogen atom or an alkyl group having 1 to 9 carbon atoms).

Preferably, $A^{14}$ and $A^{17}$ each independently denote a hydrogen atom or an alkyl group having 1 to 7 carbon atoms (one or two or more methylene groups in the alkyl group may be each independently substituted by an oxygen atom, —CO—, —COO—, or —OCO—, provided that the oxygen atoms are not directly bonded to each other).

More preferably, $A^{14}$ and $A^{17}$ each independently denote a hydrogen atom or an alkyl group having 1 to 5 carbon atoms (one or two or more methylene groups in the alkyl group may be each independently substituted by an oxygen atom, —CO—, —COO—, or —OCO—, provided that the oxygen atoms are not directly bonded to each other).

Still more preferably, $A^{14}$ and $A^{17}$ each independently denote a hydrogen atom or an alkyl group having 1 to 3 carbon atoms (one or two or more methylene groups in the alkyl group may be each independently substituted by an oxygen atom, —CO—, —COO—, or —OCO—, provided that the oxygen atoms are not directly bonded to each other).

Excessively long $A^{14}$ and $A^{17}$ also unfavorably induce spatial interference between the side chains. On the other hand, in the case where $A^{14}$ and $A^{17}$ are short alkyl chains, $A^{14}$ and $A^{17}$ can become side chains having high mobility and serve to prevent adjacent main chains from coming close to each other. Thus, $A^{14}$ and $A^{17}$ can prevent interference between polymer main chains, increase the mobility of the main chains, suppress an increase in anchoring energy at low temperature, and effectively improve the display characteristics of a polymer-stabilized liquid crystal display element in a low-temperature region.

$A^{15}$ between two side chains is preferably long in order to change the distance between side chains and also in order to increase the distance between cross-linking sites and thereby decrease the glass transition temperature. However, excessively long $A^{15}$ results in an excessively high molecular weight of a compound represented by the general formula (I-c), poor compatibility between the compound and a liquid crystal composition, and an excessively low rate of polymerization, which adversely affects phase separation. For these reasons, the length of $A^{15}$ has an upper limit.

Thus, in the present invention, $A^{15}$ is preferably an alkylene group having 9 to 16 carbon atoms (In at least 1 or more and 5 or less methylene groups in the alkylene group, one of the hydrogen atoms in the methylene group is each independently substituted by a linear or branched alkyl group having 1 to 10 carbon atoms. One or two or more methylene groups in the alkylene group may be each independently substituted by an oxygen atom, —CO—, —COO—, or —OCO—, provided that the oxygen atoms are not directly bonded to each other.).

In the present invention, therefore, the alkylene chain length of $A^{15}$ preferably corresponds to 9 to 16 carbon atoms. $A^{15}$ has a characteristic structure in which a hydrogen atom of the alkylene group is substituted by an alkyl group having 1 to 10 carbon atoms. The number of alkyl group substituents is 1 or more and 5 or less, preferably 1 to 3, more preferably 2 or 3. The number of carbon atoms of the alkyl group substituent preferably ranges from 1 to 5, more preferably 1 to 3.

A compound represented by the general formula (I-a) can be synthesized by using a known method, for example, described in Tetrahedron Letters, Vol. 30, p. 4985, Tetrahedron Letters, Vol. 23, No. 6, pp. 681-684, and Journal of Polymer Science: Part A: Polymer Chemistry, Vol. 34, pp. 217-225.

For example, a compound represented by the general formula (I-c) in which $A^{14}$ and $A^{17}$ are hydrogen can be produced by reacting a compound having a plurality of epoxy groups with a polymerizable compound having an active hydrogen that can react with an epoxy group, such as acrylic acid or methacrylic acid, to synthesize a polymerizable compound having a hydroxy group, and then reacting the polymerizable compound with a saturated fatty acid.

Furthermore, it can be produced by reacting a compound having a plurality of epoxy groups with a saturated fatty acid to synthesize a compound having a hydroxy group, and then reacting the compound having a hydroxy group with a polymerizable compound having a group that can react with a hydroxy group, such as acrylic acid chloride.

A radical polymerizable compound, for example, represented by the general formula (I-c) in which $A^{14}$ and $A^{17}$ are alkyl groups, and $A^{12}$ and $A^{18}$ are methylene groups having 1 carbon atom can be produced by reacting a compound having a plurality of oxetane groups with a fatty acid chloride or fatty acid that can react with an oxetane group and reacting the product with a polymerizable compound having an active hydrogen, such as acrylic acid, or by reacting a compound having one oxetane group with a polyvalent fatty acid chloride or fatty acid that can react with an oxetane group and reacting the product with a polymerizable compound having an active hydrogen, such as acrylic acid.

A compound represented by the general formula (I-c) in which $A^{12}$ and $A^{18}$ are alkylene groups having 3 carbon atoms (propylene group; —CH$_2$CH$_2$CH$_2$—) can be produced by using a compound having a plurality of furan groups instead of oxetane groups. A compound represented by the general formula (I-c) in which $A^{12}$ and $A^{18}$ are alkylene groups having 4 carbon atoms (butylene group; —CH$_2$CH$_2$CH$_2$CH$_2$—) can be produced by using a compound having a plurality of pyran groups instead of oxetane groups.

<Polymerizable Liquid Crystal Compound (III)>

A polymerizable liquid crystal compound (III) for use in a polymer-stabilized liquid crystal composition according to the present invention is at least one polymerizable compound (III) selected from the group consisting of the following general formulae (III-a), (III-b), and (III-c).

[Chem. 32]

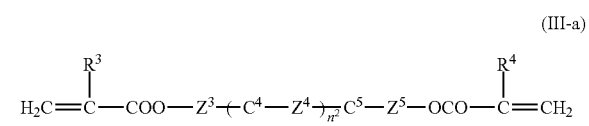

(III-a)

(In the formula (III-a), $R^3$ and $R^4$ each independently denote a hydrogen atom or a methyl group, $C^4$ and $C^5$ each independently denote a 1,4-phenylene group, a 1,4-cyclohexylene group, a pyridin-2,5-diyl group, a pyrimidin-2,5-diyl group, a pyridazin-3,6-diyl group, a 1,3-dioxan-2,5-diyl group, a cyclohexen-1,4-diyl group, a decahydronaphthalen-2,6-diyl group, a 1,2,3,4-tetrahydronaphthalen-2,6-diyl group, a 2,6-naphthylene group, or an indan-2,5-diyl group (among these groups, the 1,4-phenylene group, 1,2,3,4-tetrahydronaphthalen-2,6-diyl group, 2,6-naphthylene group, and indan-2,5-diyl group may be unsubstituted or may have one or two or more fluorine atoms, chlorine atoms, methyl groups, trifluoromethyl groups, or trifluoromethoxy groups as substituents), $Z^3$ and $Z^5$ each independently denote a single bond or an alkylene group having 1 to 15 carbon atoms (one or two or more methylene groups in the alkylene group may be each independently substituted by an oxygen atom, —CO—, —COO—, or —OCO—, provided that the oxygen atoms are not directly bonded to each other, and one or two or more hydrogen atoms in the alkylene group may be each independently substituted by a fluorine atom, a methyl group, or an ethyl group), $Z^4$ denotes a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—, and $n^2$ is 0, 1, or 2. In the case where $n^2$ is 2, a plurality of $C^4$ and $Z^4$ may be the same or different.)

[Chem. 33]

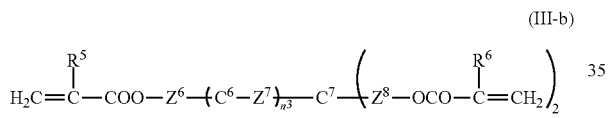

(III-b)

(In the formula (III-b), $R^5$ and $R^6$ each independently denote a hydrogen atom or a methyl group, $C^6$ denotes a 1,4-phenylene group, a 1,4-cyclohexylene group, a pyridin-2,5-diyl group, a pyrimidin-2,5-diyl group, a pyridazin-3,6-diyl group, a 1,3-dioxan-2,5-diyl group, a cyclohexen-1,4-diyl group, a decahydronaphthalen-2,6-diyl group, a 1,2,3,4-tetrahydronaphthalen-2,6-diyl group, a 2,6-naphthylene group, or an indan-2,5-diyl group (among these groups, the 1,4-phenylene group, 1,2,3,4-tetrahydronaphthalen-2,6-diyl group, 2,6-naphthylene group, and indan-2,5-diyl group may be unsubstituted or may have one or two or more fluorine atoms, chlorine atoms, methyl groups, trifluoromethyl groups, or trifluoromethoxy groups as substituents), $C^7$ denotes a benzen-1,2,4-triyl group, a benzen-1,3,4-triyl group, a benzen-1,3,5-triyl group, a cyclohexan-1,2,4-triyl group, a cyclohexan-1,3,4-triyl group, or a cyclohexan-1,3,5-triyl group, $Z^6$ and $Z^8$ each independently denote a single bond or an alkylene group having 1 to 15 carbon atoms (one or two or more methylene groups in the alkylene group may be each independently substituted by an oxygen atom, —CO—, —COO—, or —OCO—, provided that the oxygen atoms are not directly bonded to each other, and one or two or more hydrogen atoms in the alkylene group may be each independently substituted by a fluorine atom, a methyl group, or an ethyl group), $Z^7$ denotes a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—, and $n^3$ is 0, 1, or 2. In the case where $n^3$ is 2, a plurality of $C^6$ and $Z^7$ may be the same or different.)

[Chem. 34]

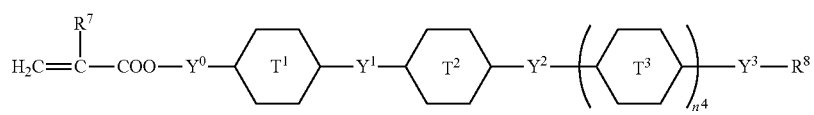

(III-c)

(In the formula (III-c), $R^7$ denotes a hydrogen atom or a methyl group, and 6-membered rings $T^1$, $T^2$, and $T^3$ each independently denote one of the following (wherein m is an integer in the range of 1 to 4),

[Chem. 35]

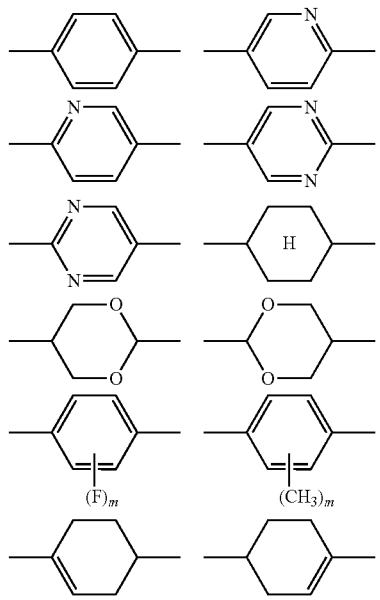

$n^4$ is an integer of 0 or 1, $Y^0$, $Y^1$, and $Y^2$ each independently denote a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—, $Y^3$ denotes a single bond, —O—, —COO—, or —OCO—, and $R^8$ denotes a hydrogen atom, a halogen atom, a cyano group, an alkyl group having 1 to 20 carbon atoms, an alkenyl group having 1 to 20 carbon atoms, an alkoxy group having 1 to 20 carbon atoms, or a hydrocarbon group having 1 to 20 carbon atoms.)

More specifically, a compound represented by the general formula (III-d) or (III-e) is preferably used to produce an optical anisotropic substance having high mechanical strength and heat resistance.

[Chem. 36]

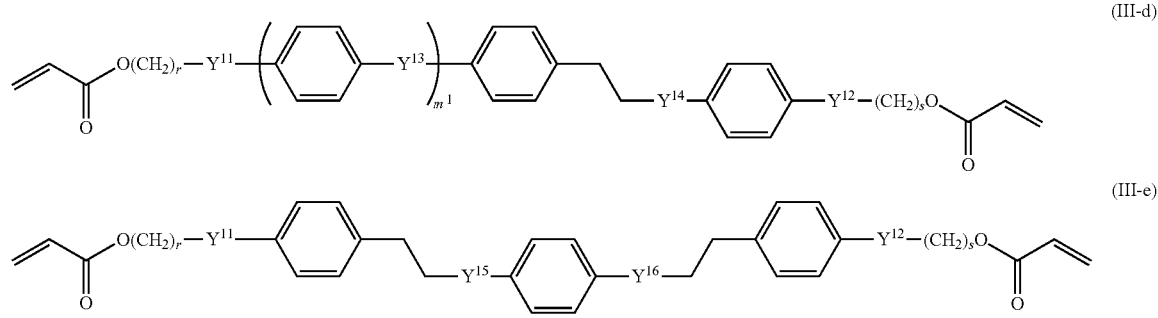

(In the formulae (III-d) and (III-e), $m^1$ is 0 or 1, and $Y^{11}$ and $Y^{12}$ each independently denote a single bond, —O—, —COO—, or —OCO—, $Y^{13}$ and $Y^{14}$ each independently denote —COO— or —OCO—, $Y^{15}$ and $Y^{16}$ each independently denote —COO— or —OCO—, and r and s are each independently an integer in the range of 2 to 14. The 1,4-phenylene group in the formula may be unsubstituted or may have one or two or more fluorine atoms, chlorine atoms, methyl groups, trifluoromethyl groups, or trifluoromethoxy groups as substituents.)

Specific examples of a compound represented by the general formula (III-a) include the following (III-1) to (III-10).

[Chem. 37]

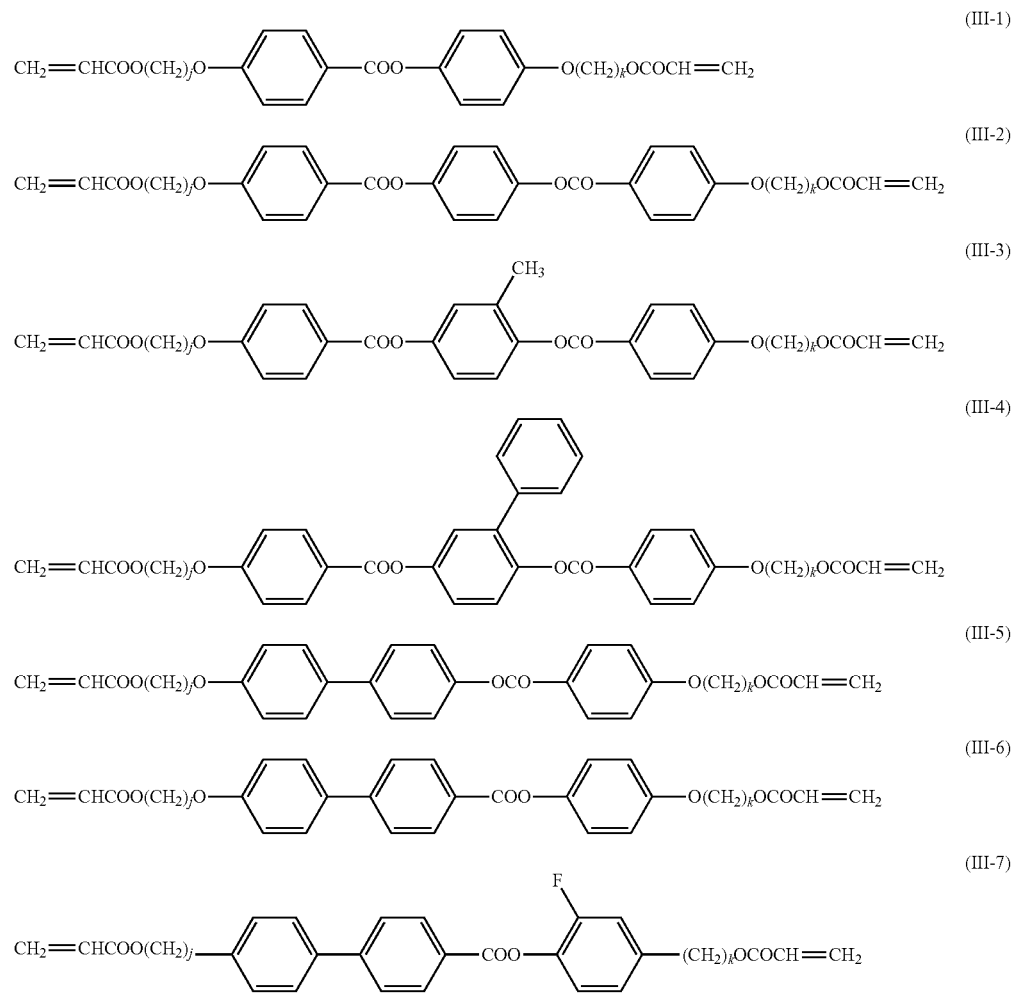

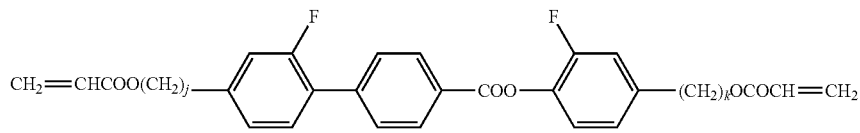
(III-8)
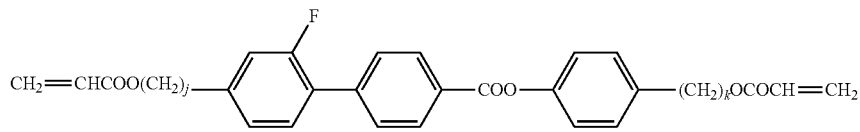
(III-9)
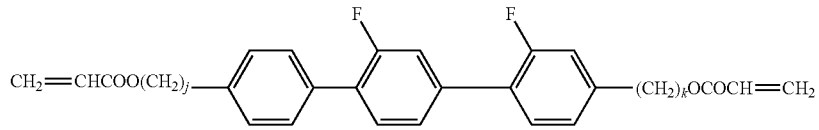
(III-10)
(wherein j and k are each independently an integer in the range of 2 to 14)
Specific examples of a compound represented by the general formula (III-d) or (III-e) include the following (III-11) to (III-20).
[Chem. 38]
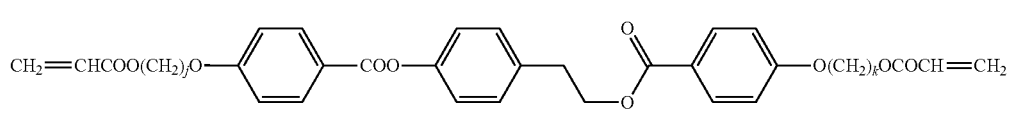
(III-11)
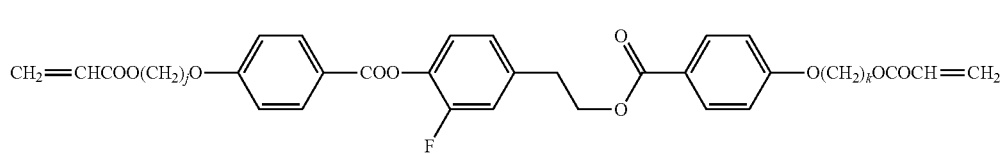
(III-12)
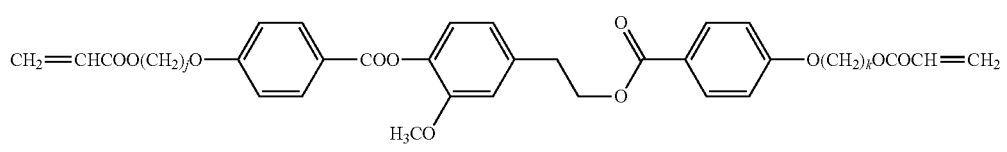
(III-13)
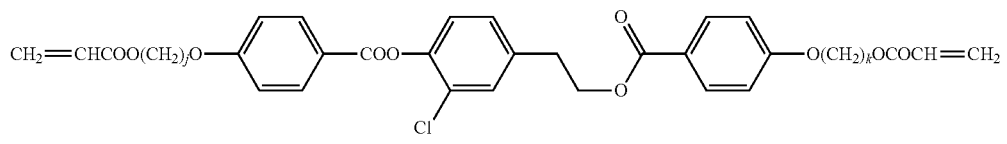
(III-14)
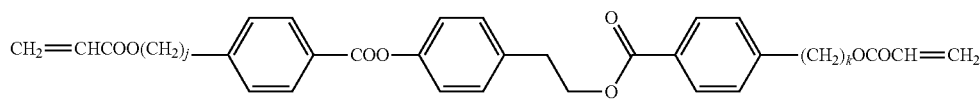
(III-15)
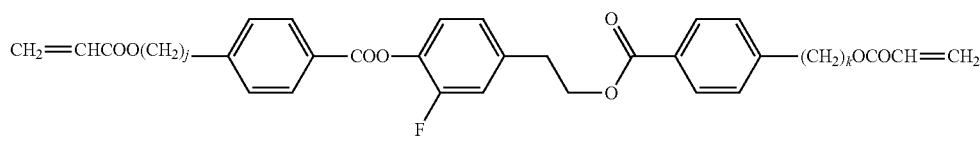
(III-16)
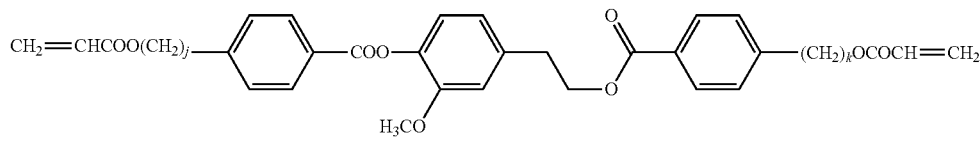
(III-17)

-continued

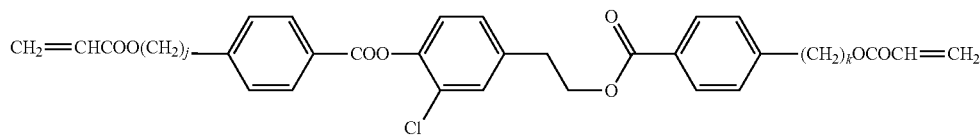
(III-18)

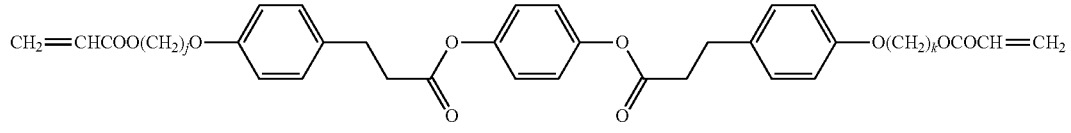
(III-19)

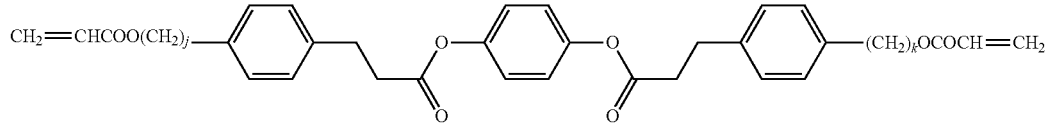
(III-20)

(wherein j and k are each independently an integer in the range of 2 to 14)

<Chiral Photopolymerizable Monomer>

Photopolymerizable monomers (polymerizable compounds) may be chiral substances as well as the achiral substances as described above. Examples of chiral photopolymerizable monomers include polymerizable compounds represented by the following general formula (III-x).

[Chem. 39]

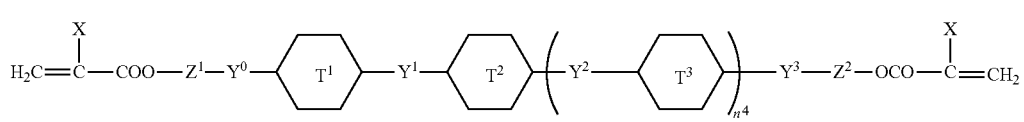
(III-x)

In the formula (III-x), X denotes a hydrogen atom or a methyl group. $n^4$ is an integer of 0 or 1. 6-membered rings $T^1$, $T^2$, and $T^3$ denote substituents having 6-membered ring structure, such as a 1,4-phenylene group and a trans-1,4-cyclohexylene group. The 6-membered rings $T^1$, $T^2$, and $T^3$ are not limited to these substituents, may have one of substituents having the following structures, and may be the same or different. In these substituents, m is an integer in the range of 1 to 4.

[Chem. 40]

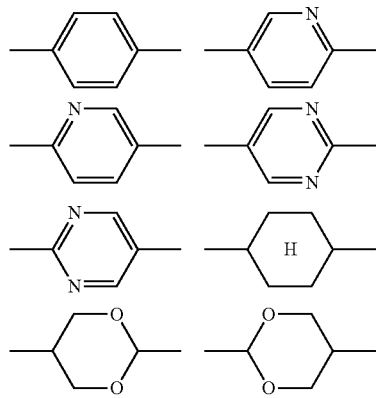

-continued

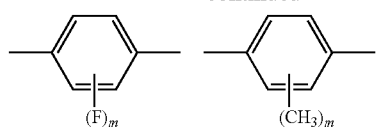

(F)$_m$  (CH$_3$)$_m$

-continued

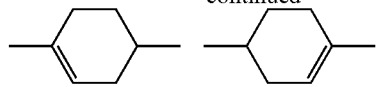 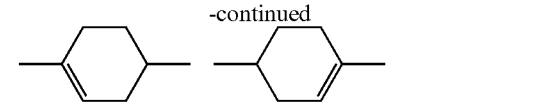

$Y^1$ and $Y^2$ in the formula (III-x) each independently denote a linear or branched alkylene group having 1 to 10 carbon atoms, and one CH$_2$ group or nonadjacent two CH$_2$ groups in the alkylene group may be substituted by —O—, —S—, —CO—O—, or —O—CO—, or may include a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—. $Y^1$ and $Y^2$ may or may not have an asymmetric carbon atom. Thus, $Y^1$ and $Y^2$ may be the same or different, provided that $Y^1$ and $Y^2$ have any of the structures described above.

$Y^0$ and $Y^3$ denote single bonds, —O—, —OCO—, or —COO—.

$Z^1$ denotes an alkylene group that has an asymmetric carbon atom, a branched-chain structure, and 3 to 20 carbon atoms.

$Z^2$ denotes an alkylene group having 1 to 20 carbon atoms and may or may not have an asymmetric carbon atom.

<Ferroelectric Liquid Crystal Composition>

The pitch of the chiral nematic phase is preferably increased as much as possible to improve alignment. To this end, a plurality of chiral compounds having different pitch chiralities are preferably used in combination as pitch cancellers, which are additive agents for cancelling pitches, thereby cancelling and increasing the pitch. In this case, chiral compounds having the same spontaneous polarization sign are preferably chosen so as not to cancel spontaneous polarization, or even when the chiral compounds have opposite spontaneous polarization signs, a combination of a chiral compound having large spontaneous polarization and a chiral compound having small spontaneous polarization is preferably used to produce sufficient spontaneous polarization as a balance. The chiral compounds are also preferably chosen to provide satisfactory alignment without performing such pitch cancelling.

When a ferroelectric liquid crystal composition according to the present invention contains a polymerizable compound, the polymerizable compound may be polymerized by radical polymerization, anionic polymerization, or cationic polymerization. Radical polymerization is preferred.

A thermal polymerization initiator or a photopolymerization initiator may be used as a radical polymerization initiator. A photopolymerization initiator is preferred. More specifically, the following compounds are preferred.

Acetophenones, such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, and 2-benzyl-2-dimethylamino-1-(4-morpholinophenyl)-butanone;

benzoins, such as benzoin, benzoin isopropyl ether, and benzoin isobutyl ether;

acylphosphine oxides, such as 2,4,6-trimethylbenzoyldiphenylphosphine oxide;

benzyl, methyl phenylglyoxylates;

benzophenones, such as benzophenone, methyl o-benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3', 4,4'-tetra(t-butylperoxycarbonyl)benzophenone, and 3,3'-dimethyl-4-methoxybenzophenone;

thioxanthones, such as 2-isopropylthioxanthone, 2,4-dimethylthioxanthone, 2,4-diethylthioxanthone, and 2,4-dichlorothioxanthone;

aminobenzophenones, such as Michler's ketone and 4,4'-diethylaminobenzophenone; and 10-butyl-2-chloroacridone, 2-ethylanthraquinone, 9,10-phenanthrenequinone, and camphorquinone are preferred. Among these, benzyl dimethyl ketal is most preferred.

In the present invention, in addition to a polymerizable liquid crystal compound (III), a polyfunctional liquid crystal monomer may be added. Examples of a polymerizable functional group of the polyfunctional liquid crystal monomer include an acryloyloxy group, a methacryloyloxy group, an acrylamide group, a methacrylamide group, an epoxy group, a vinyl group, a vinyloxy group, an ethynyl group, a mercapto group, a maleimide group, ClCH=CHCONH—, $CH_2$=CCl—, CHCl=CH—, and RCH=CHCOO— (wherein R denotes chlorine, fluorine, or a hydrocarbon group having 1 to 18 carbon atoms). Among these, an acryloyloxy group, a methacryloyloxy group, an epoxy group, a mercapto group, and a vinyloxy group are preferred. A methacryloyloxy group or an acryloyloxy group is particularly preferred. An acryloyloxy group is most preferred.

The molecular structure of the polyfunctional liquid crystal monomer preferably includes a liquid crystal skeleton having two or more ring structures, a polymerizable functional group, and at least two flexible groups, more preferably three flexible groups, that link the liquid crystal skeleton with the polymerizable functional group. Examples of the flexible groups include alkylene spacer groups represented by —$(CH_2)_n$— (wherein n denotes an integer) and siloxane spacer groups represented by —$(Si(CH_3)_2$—O$)_n$— (wherein n denotes an integer). Among these, alkylene spacer groups are preferred. The bonding between the flexible groups and the liquid crystal skeleton or the polymerizable functional group may include a linkage, like —O—, —COO—, or —CO—.

In order to facilitate the alignment of the liquid crystal composition (an alignment aid), nanoparticles of organic particles, inorganic particles, or organic inorganic hybrid particles may also be added. Examples of the organic particles include particles of polymers, including polystyrene, poly(methyl methacrylate), polyhydroxyacrylate, and divinylbenzene. Examples of the inorganic particles include oxides, including barium titanate ($BaTiO_3$), $SiO_2$, $TiO_2$, and $Al_2O_3$, and metals, including Au, Ag, Cu, and Pd. The organic particles and the inorganic particles may be coated with another material to form hybrid particles. The inorganic particles may be coated with an organic material to form organic inorganic hybrid particles. When an organic substance on the surface of the inorganic particles has liquid crystallinity, this advantageously facilitates the alignment of surrounding liquid crystal molecules.

If necessary, an antioxidant, an ultraviolet absorber, a nonreactive oligomer, inorganic filler, organic filler, a polymerization inhibitor, an antifoaming agent, a leveling agent, a plasticizer, and/or a silane coupling agent may be appropriately added. A biaxial compound, such as discotic liquid crystals, and/or a trap material for ions and polar compounds may also be contained.

In the presence of two polarizers, a polarization axis of each of the polarizers may be adjusted to improve the view angle or contrast.

<Alignment Film>

Substrate faces that hold liquid crystals therebetween may be provided with an alignment film. The alignment film may be an alignment or photo-alignment film formed of a common polyimide.

The alignment film preferably has homeotropic alignment ability.

A polyimide alignment film having homeotropic alignment ability is preferred. Specific examples include a polyamic acid produced by a reaction between an acid anhydride substituted by an alkyl long chain or an alicyclic group, a diamine substituted by an alkyl long chain or an alicyclic group, and an acid dianhydride, or a polyimide produced by dehydration and ring-opening of the polyamic acid. A liquid crystal alignment film having homeotropic alignment ability can be formed by applying a liquid-crystal alignment agent composed of a polyimide, polyamide, or polyamic acid having such a bulky group to a substrate.

Examples of the acid anhydride include compounds represented by the following general formulae (VII-a1) to (VII-a3). Examples of the diamine include compounds represented by the following general formulae (VII-b1) to (VII-b3).

[Chem. 41]

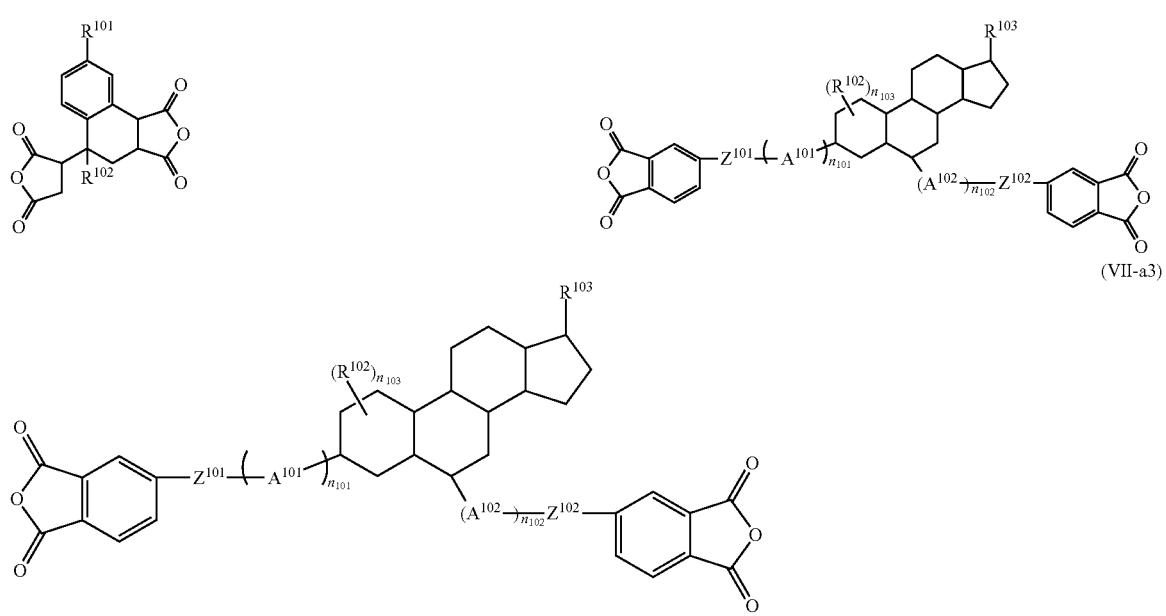

(VII-a1) (VII-a2) (VII-a3)

[Chem. 42]

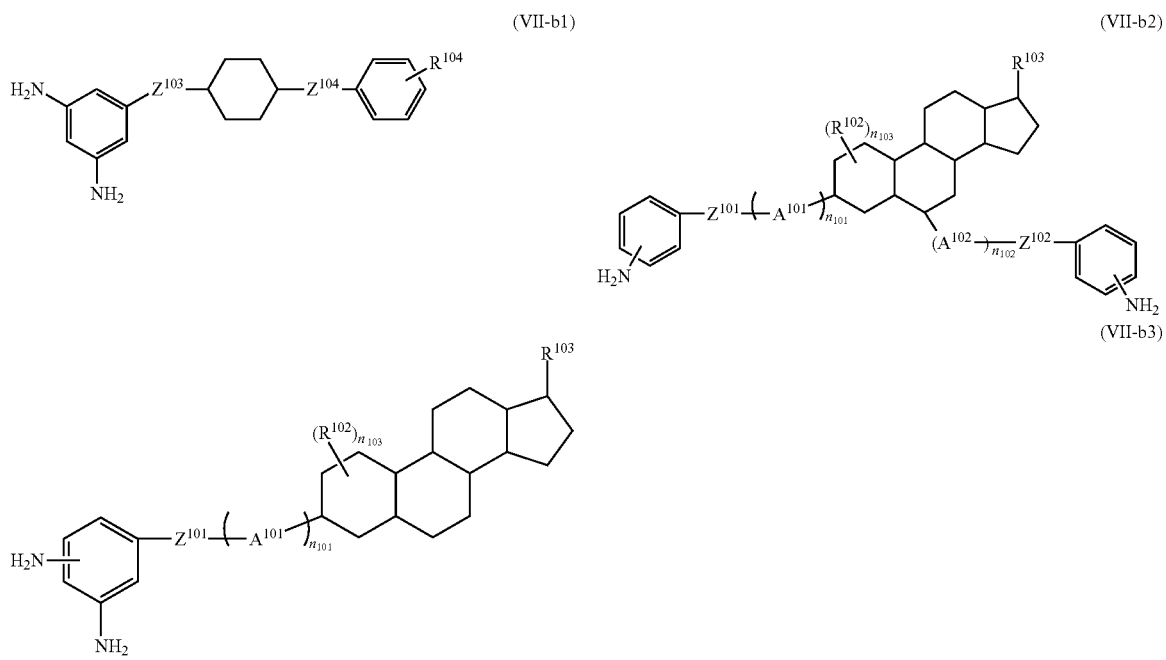

(VII-b1) (VII-b2) (VII-b3)

In the formulae (VII-a1) to (VII-a3) and (VII-b1) to (VII-b3), $R^{101}$, $R^{102}$, $R^{103}$, and $R^{104}$ each independently denote a linear or branched alkyl group having 1 to 30 carbon atoms, a hydrogen atom, or a fluorine atom, one or two or more nonadjacent —$CH_2$— groups in the alkyl group may be substituted by —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—, and one or more hydrogen atoms in the alkyl group may be substituted by a fluorine atom, a chlorine atom, a bromine atom, or a CN group, $Z^{101}$, $Z^{102}$, $Z^{105}$, and $Z^{104}$ each independently denote —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond, $A^{101}$ and $A^{102}$ each independently denote a cyclic group selected from a phenylene group, a cyclohexylene group, a dioxolanediyl group, a cyclohexenylene group, a bicyclo[2.2.2]octylene group, a piperidinediyl group, naphthalenediyl group, a decahydronaphthalenediyl group, a tetrahydronaphthalenediyl group, or an indandiyl group, one or two or more —CH= groups in the ring(s) of the phenylene group, naphthalenediyl group, tetrahydronaphthalenediyl group, or indandiyl group may be substituted by a nitrogen atom, one or two nonadjacent —CH$_2$— groups in the ring(s) of the cyclohexylene group, dioxolanediyl group, cyclohexenylene group, bicyclo[2.2.2]octylene group, piperidinediyl group, decahydronaphthalenediyl group, tetrahydronaphthalenediyl group, or indandiyl group may be substituted by —O— and/or —S—, and one or more hydrogen atoms of the cyclic group may be substituted by a fluorine atom, a chlorine atom, a bromine atom, a CN group, a NO$_2$ group, an alkyl group, an alkoxy group, an alkylcarbonyl group, or an alkoxycarbonyl group, the alkyl group, alkoxy group, alkylcarbonyl group, or alkoxycarbonyl group each having 1 to 7 carbon atoms, one or two or more hydrogen atoms of the alkyl group, alkoxy group, alkylcarbonyl group, or alkoxycarbonyl group being optionally substituted by a fluorine atom or a chlorine atom, and $n^{101}$ and $n^{102}$ are each independently 0 or 1, and $n^{103}$ is an integer in the range of 0 to 5.

In the general formulae (VII-a2) and (VII-a3) and (VII-b2) and (VII-b3), a —CH$_2$— group in the steroid skeleton may be substituted by —O— and/or —S—, and the steroid skeleton may have one or two or more unsaturated bonds (C=C) at any position.

In a horizontal electric field liquid crystal display element in which an electric field is applied in the transverse direction, a polyamic acid or polyimide having structures represented by the formulae (VII-c1) and (VII-c2) is preferably used as a liquid-crystal alignment agent for an alignment film according to a preferred embodiment because the alignment film has excellent image retention characteristics, and light transmittance in a dark state in the absence of an electric field can be decreased.

[Chem. 43]

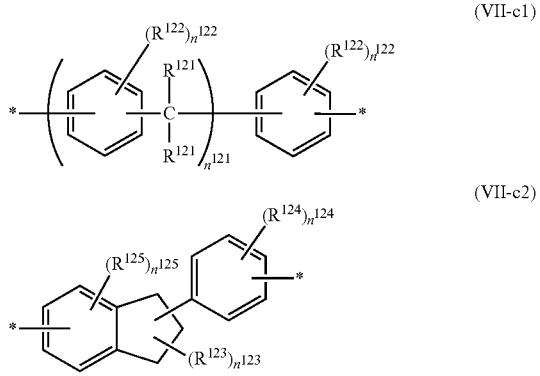

(VII-c1)

(VII-c2)

In the formula (VII-c1), $R^{121}$ each independently denotes an alkyl group having 1 to 6 carbon atoms, and $R^{122}$ each independently denotes an alkyl group having 1 to 6 carbon atoms, a halogen atom, a cyano group, a hydroxy group, or a carboxy group, and $n^{121}$ is an integer in the range of 1 to 10, $n^{122}$ is each independently an integer in the range of 0 to 4, and "*" represents a bonding arm.

In the formula (VII-c2), $R^{123}$ each independently denotes an alkyl group having 1 to 6 carbon atoms, and $R^{124}$ each independently denotes an alkyl group having 1 to 6 carbon atoms, a halogen atom, a cyano group, a hydroxy group, or a carboxy group, and $n^{123}$ is an integer in the range of 0 to 5, $n^{124}$ is an integer in the range of 0 to 4, $n^{125}$ is an integer in the range of 0 to 3, and "*" represents a bonding arm.

A polyamic acid having a structure represented by the formula (VII-c1) and a structure represented by the formula (VII-c2) in at least part of the molecule thereof can be produced by reacting a tetracarboxylic acid dianhydride having the structure represented by the formula (VII-c1) and a tetracarboxylic acid dianhydride having the structure represented by the formula (VII-c2) with a diamine, or by reacting a diamine having the structure represented by the formula (VII-c1) and a diamine having the structure represented by the formula (VII-c2) with a tetracarboxylic acid dianhydride.

More specifically, a tetracarboxylic acid dianhydride having a structure represented by the formula (VII-c1) or (VII-c2) may be a compound in which both terminal benzene rings having the bonding arm represented by "*" are phthalic anhydride groups.

More specifically, a diamine having a structure represented by the formula (VII-c1) or (VII-c2) may be a compound in which both terminal benzene rings having the bonding arm represented by "*" are aniline groups.

Examples of the photo-alignment film include photo-alignment films having a structure of azobenzene, stilbene, α-hydrazono-β-keto ester, or coumarin and utilizing photoisomerization; photo-alignment films having a structure of azobenzene, stilbene, benzylidene phthaldiimide, or cinnamoyl and utilizing photo-geometrical isomerization; photo-alignment films having a structure of spiropyran or spirooxazine and utilizing ring opening and closing photoreaction; photo-alignment films having a structure of cinnamoyl, chalcone, coumarin, or diphenylacetylene and utilizing photodimerization; photo-alignment films having a structure of soluble polyimide or cyclobutane polyimide and utilizing photolysis by photoirradiation; and photo-alignment films formed by photoirradiation from a polyimide produced by a reaction between biphenyltetracarboxylic acid dianhydride and diaminodiphenyl ether (BPDA/DPE).

A photo-alignment film can be manufactured by irradiating a coating film containing a compound having a photo-alignment group with anisotropic light to align the photo-alignment group and fixing the photo-alignment state.

When the compound having a photo-alignment group has a polymerizable group, photoirradiation for providing liquid-crystal alignment ability is preferably followed by polymerization. The polymerization method may be photopolymerization or thermal polymerization. For photopolymerization, a photopolymerization initiator is added to a photo-alignment agent, and after photoirradiation, a photopolymerization reaction is initiated, for example, by irradiation with light having a different wavelength. For thermal polymerization, a thermal polymerization initiator is added to a photo-alignment agent, and a thermal polymerization reaction is initiated by heating after photoirradiation.

The photo-alignment state of a photo-alignment film may be fixed using a photocrosslinking polymer.

A photocrosslinking polymer photo-alignment film may be formed from compounds described in (VIII-a) and (VIII-b).

[Chem. 44]

(VIII-a)

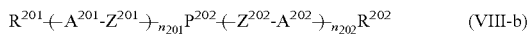

(VIII-b)

(wherein $R^{201}$ and $R^{202}$ each independently denote a linear or branched alkyl group having 1 to 30 carbon atoms, a hydrogen atom, or a fluorine atom, one or two or more nonadjacent —$CH_2$— groups in the alkyl group may be substituted by —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—, one or more hydrogen atoms in the alkyl group may be substituted by a fluorine atom, a chlorine atom, a bromine atom, or a CN group, or may have a polymerizable group, the alkyl group may have a condensed or spirocyclic system, the alkyl group may have one or two or more aromatic or aliphatic rings that can contain one or two or more heteroatoms, and these rings may be substituted by an alkyl group, an alkoxy group, or halogen, $Z^{201}$ and $Z^{202}$ each independently denote —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond, and $R^a$ in —CO—N($R^a$)— or —N($R^a$)—CO— denotes a hydrogen atom or a linear or branched alkyl group having 1 to 4 carbon atoms, $A^{201}$ and $A^{202}$ each independently denote a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, or an indandiyl group, one or two or more —CH= groups in the ring(s) of the phenylene group, naphthalenediyl group, tetrahydronaphthalenediyl group, or indandiyl group may be substituted by a nitrogen atom, one or two nonadjacent —$CH_2$— groups in the ring(s) of the cyclohexylene group, dioxolanediyl group, cyclohexenylene group, bicyclo[2.2.2]octylene group, piperidinediyl group, decahydronaphthalenediyl group, tetrahydronaphthalenediyl group, or indandiyl group may be substituted by —O— and/or —S—, and one or more hydrogen atoms of the cyclic group may be substituted by a fluorine atom, a chlorine atom, a bromine atom, a CN group, a $NO_2$ group, an alkyl group, an alkoxy group, an alkylcarbonyl group, or an alkoxycarbonyl group, the alkyl group, alkoxy group, alkylcarbonyl group, or alkoxycarbonyl group each having 1 to 7 carbon atoms, one or two or more hydrogen atoms of the alkyl group, alkoxy group, alkylcarbonyl group, or alkoxycarbonyl group being optionally substituted by a fluorine atom or a chlorine atom, $n_{201}$ and $n_{202}$ are each independently an integer in the range of 1 to 3, and $P^{201}$ and $P^{202}$ each independently denote a photo-alignment group, such as cinnamoyl, coumarin, benzylidene phthaldiimide, chalcone, azobenzene, or stilbene. $P^{201}$ is a monovalent group, and $P^{202}$ is a divalent group.

Examples of more preferred compounds include compounds having a cinnamoyl group represented by the formula (VIII-c), compounds having a coumarin group represented by the formula (VIII-d), and compounds having a benzylidene phthaldiimide group represented by the formula (VIII-e).

[Chem. 45]

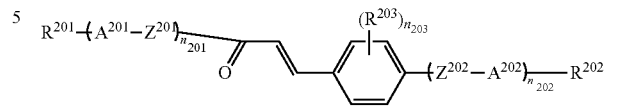

(VIII-c)

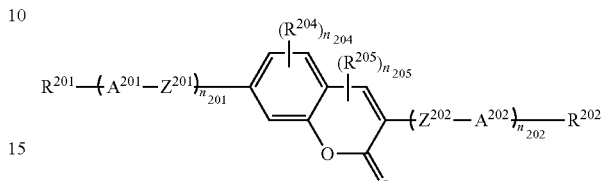

(VIII-d)

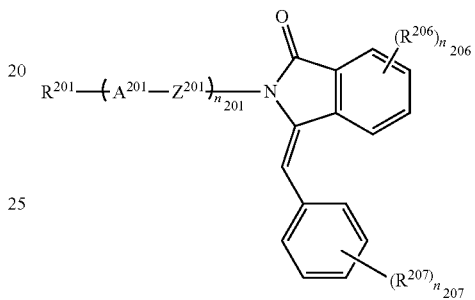

(VIII-e)

In the formula (VIII-c), (VIII-d), and (VIII-e), the definitions of $R^{201}$, $R^{202}$, $A^{201}$, $A^{202}$, $Z^{201}$, $Z^{202}$, $n_{201}$, and $n_{202}$ are the same as in the formula (VIII-a) and (VIII-b), $R^{202}$, $R^{204}$, $R^{205}$, $R^{206}$, and $R^{207}$ each independently denote a halogen atom (F, Cl, Br, or I), a methyl group, a methoxy group, —$CF_3$, —$OCF_3$, a carboxy group, a sulfo group, a nitro group, an amino group, or a hydroxy group, and $n^{203}$ is an integer in the range of 0 to 4, $n^{204}$ is an integer in the range of 0 to 3, $n^{205}$ is an integer in the range of 0 to 1, $n^{206}$ is an integer in the range of 0 to 4, and $n^{207}$ is an integer in the range of 0 to 5.

EXAMPLES

The present invention will be more specifically described with the following examples. However, the present invention is not limited to these examples. Unless otherwise specified, "%" means "% by mass".

Abbreviations and their meanings in voltage-transmittance characteristics of a liquid crystal display element in the examples are as follows:

$V_{10}$: A voltage to be applied to achieve light transmittance defined by ($T_{100}$−$T_d$×0.1+$T_0$, wherein the light transmittance ($T_0$) of the liquid crystal display element in the absence of a voltage is 0%, and the light transmittance ($T_{100}$), which is the highest light transmittance after light transmittance increases with increasing applied voltage, is 100%.

$V_{90}$: A voltage to be applied to achieve light transmittance defined by ($T_{100}$−$T_0$)×0.9+$T_0$, wherein the light transmittance ($T_0$) of the liquid crystal display element in the absence of a voltage is 0%, and the light transmittance ($T_{100}$), which is the highest light transmittance after light transmittance increases with increasing applied voltage, is 100%.

In voltage-transmittance measurement, a cell was placed between two crossed nicols polarizers. A long axis of an interdigitated electrode formed 45 degrees with a polarization axis of the polarizers. Changes in the amount of transmitted light were measured while a 0 to 50 $V_{o-p}$ voltage was applied using a rectangular wave at a frequency of 60 Hz.

Example 1

Two substrates each having a homeotropic alignment film (a polyimide homeotropic alignment film JALS 2096 manufactured by JSR Corporation) were prepared. The homeotropic alignment films were subjected to rubbing treatment. The homeotropic alignment films on a first substrate and a second substrate were rubbed in opposite directions by antiparallel rubbing as in parallel alignment treatment. Interdigitated electrodes (ITO transparent electrodes, interelectrode distance: 12.5 µm, electrode width: 20 µm) were placed. The two substrates were opposed to each other such that the cell thickness (gap) was 5.5 µm. The following ferroelectric liquid crystal composition LC-1 was injected into the cell utilizing capillarity due to heating. After injection, the liquid crystal cell was sealed. Thus, a liquid crystal display element according to Example 1 was manufactured.

The ferroelectric liquid crystal composition LC-1 has a phase sequence of ISO-N*-SmA-SmC* and has phase transition temperatures of 85.5° C. between ISO-N*, 76.4° C. between N*-SmA, and 60.3° C. between SmA-SmC*. The helical pitch of chiral nematic liquid crystals at a temperature (87.5° C.) that is 2° C. higher than the N* to SmC* transition temperature is 148 µm.

In Example 1, an area between the interdigitated electrodes through which light passes is considered to be an opening ratio. The opening ratio is 0.385. Retardation was measured using a rotation analyzer method using REST-100 manufactured by Otsuka Electronics Co., Ltd.

Retardation in an electric field ON state was 275 nm, retardation in an OFF state was 193 nm, and the helical pitch of the SmC* phase was 16.4 µm.

Polarizing microscope observation showed that when the rubbing alignment direction coincided with the polarization direction, this resulted in a completely dark field. Rotation of C-directors in response to the application of an electric field resulted in a bright field. The brightest field was obtained at 45 degrees. This proved that the liquid crystals were uniaxially aligned.

In the measurement of V-T characteristics, the minimum transmittance $T_0$ was 1.5% (polarization direction), the maximum transmittance $T_{100}$ was 18% (45 degrees), the voltage $V_{10}$ was 6.5 V, and the voltage $V_{90}$ was 35.4 V.

In Example 1, the helical structure was loosened even in a voltage OFF state, and transmittance depended on the polarization direction of transmitting light. Thus, alignment of liquid crystal molecules in one direction at an angle of 45 degrees with the electric field direction in the electric field ON state resulted in a completely dark field in the OFF state, and high contrast was achieved by ON-OFF.

Example 2

A cell was manufactured in the same manner as in Example 1 except that the ferroelectric liquid crystal composition LC-1 was replaced with the following achiral smectic C liquid crystal composition LC-2.

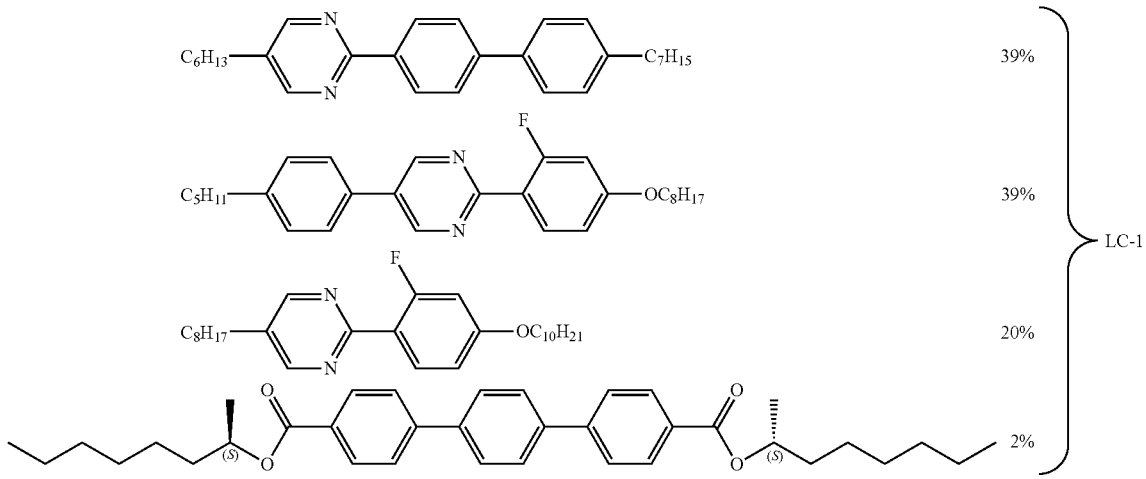

[Chem. 46]

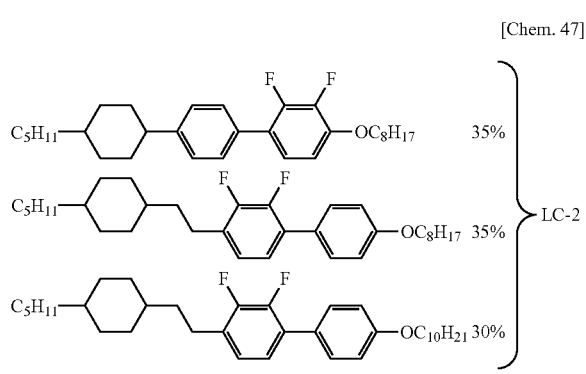

[Chem. 47]

The achiral smectic C liquid crystal composition LC-2 has a phase sequence of ISO-N-SmA-SmC. The SmC phase is stable at room temperature. The phase transition temperatures are 131.9° C. between ISO-N, 110.3° C. between N-SmA, and 64.2° C. between SmA-SmC. Because the achiral smectic C liquid crystal composition LC-2 contains no chiral compound, the N phase and SmC phase have no helix structure.

Polarizing microscope observation showed that when the direction of the rubbing alignment treatment, which formed 45 degrees with the horizontal electric field direction of the interdigitated electrodes, coincided with the polarization direction, this resulted in a dark field. The brightest field was obtained when C-directors were aligned along the electric field direction at 45 degrees with the orthogonal polarizers in response to the application of a horizontal electric field. This proved that C-directors performed in-plane switching operation.

In the measurement of V-T characteristics, the minimum transmittance $T_0$ was 0.6% (polarization direction), the maximum transmittance $T_{100}$ was 11% (45 degrees), the voltage $V_{10}$ was 7.3 V, and the voltage $V_{90}$ was 17 V.

In Example 2, the helical structure was loosened even in a voltage OFF state, and transmittance depended on the polarization direction of transmitting light. Thus, alignment of liquid crystal molecules in one direction at an angle of 45 degrees with the electric field direction in the electric field ON state resulted in a dark field in the OFF state, and ON-OFF switching operation utilizing negative dielectric anisotropy in the smectic C phase was proved.

Comparative Example 1

A cell was manufactured in the same manner as in Example 1 except that the ferroelectric liquid crystal composition LC-1 was replaced with the following ferroelectric liquid crystal composition LC-3.

The ferroelectric liquid crystal composition LC-3 has a phase sequence of ISO-N*-SmA-SmC* and has phase transition temperatures of 91° C. between ISO-N*, 71° C. between N*-SmA, and 65.4° C. between SmA-SmC*. The helical pitch of the SmC* phase was measured using selective reflection. The selective reflection is 480 nm.

Polarizing microscope observation showed that when the rubbing alignment direction coincided with the polarization direction, this resulted in a completely dark field. Rotation of C-directors in response to the application of an electric field resulted in a bright field. The brightest field was obtained at 45 degrees. This proved that the liquid crystals were uniaxially aligned.

In the measurement of V-T characteristics, the minimum transmittance $T_0$ was 0.3% (polarization direction), the maximum transmittance $T_{100}$ was 7% (45 degrees), the voltage $V_{10}$ was 24 V, and the voltage $V_{90}$ was 48 V. Thus, the driving voltage is increased.

REFERENCE SIGNS LIST 10, 20 Substrate
11, 21 Transparent substrate
12, 22 Homeotropic alignment film
13 Pretilt alignment direction
14 Direction of C-directors under applied voltage
24 Electrode structure
31 Liquid crystal composition layer
32 Liquid crystal molecules
33 Refractive index distribution at 45 degrees with electrode structure
34 Refractive index distribution parallel to electrode structure

[Chem. 48]

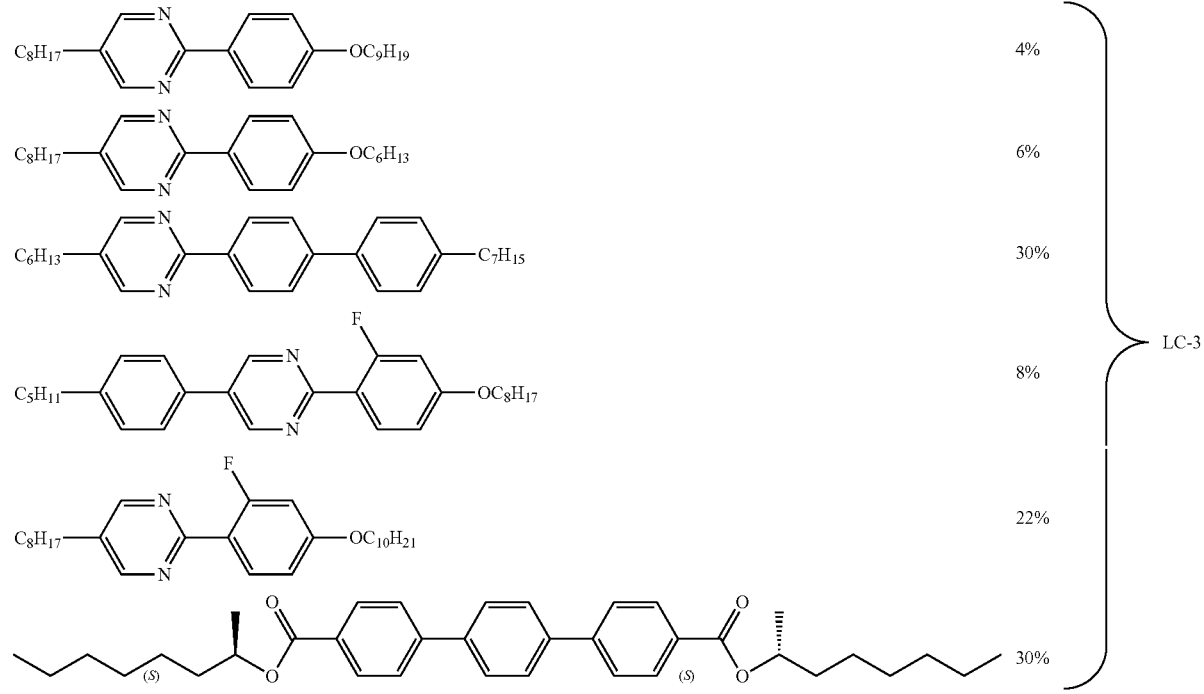

The invention claimed is:

1. A liquid crystal light modulator, comprising:
   two polarizers that have planes of polarization perpendicular to each other;
   a first substrate and a second substrate disposed between the polarizers and holding a liquid crystal composition layer therebetween, the liquid crystal composition layer containing a liquid crystal composition at least one of the first and second substrates being transparent; and
   a pair of electrode structures that generate an electric field generally parallel to a substrate face of said at least one of the first substrate and the second substrate,
   wherein at least one of the first substrate and the second substrate has a homeotropic alignment film and has a function of aligning C-directors of liquid crystal molecules along one direction,
   the one direction forms an azimuth angle in the range of 35 to 55 degrees with the direction of the electric field generated by the pair of electrode structures,
   the liquid crystal composition is a liquid crystal composition having an achiral smectic C phase having a negative dielectric anisotropy, and
   C-directors of liquid crystal molecules are aligned by the alignment function along the one direction at contact portions between the liquid crystal composition layer and the first substrate and between the liquid crystal composition layer and the second substrate, the C-directors of the liquid crystal molecules are parallel to each other between the first substrate and the second substrate, the C-directors of the liquid crystal molecules are aligned at an azimuth angle in the range of 35 to 55 degrees with the electric field direction generally parallel to the substrate face, and light transmittance is modulated by the electric field generated by the electrode structures changing the birefringence index of the liquid crystal composition layer.

2. The liquid crystal light modulator according to claim 1, wherein retardation saturated due to the electric field ranges from 225 to 330 nm.

3. The liquid crystal light modulator according to claim 1, wherein the chiral smectic C phase or the achiral smectic C phase in the liquid crystal composition layer has a substantially completely loosened helix axis in the absence of an electric field and has a layer structure parallel to the substrate face, and the C-directors of the liquid crystal molecules are aligned along the one direction.

4. The liquid crystal light modulator according to claim 1, wherein the liquid crystal composition is the ferroelectric liquid crystal composition having the chiral smectic C phase, and the ferroelectric liquid crystal composition has a phase sequence of at least an isotropic phase, a chiral nematic phase, a smectic A phase, and the chiral smectic C phase from a high-temperature side or a phase sequence of at least an isotropic phase, a chiral nematic phase, and the chiral smectic C phase from the high-temperature side.

5. The liquid crystal light modulator according to claim 1, wherein the liquid crystal composition is the ferroelectric liquid crystal composition having the chiral smectic C phase, and the chiral nematic phase has a helical pitch of 50 µm or more at a temperature 2° C. higher than the lower limit temperature of the chiral nematic phase, the lower limit temperature being the temperature of a phase transition from the chiral nematic phase to the smectic A phase or chiral smectic C phase during temperature decrease in the phase sequence of the ferroelectric liquid crystal composition.

6. The liquid crystal light modulator according to claim 1, wherein the liquid crystal composition is said another liquid crystal composition, wherein the achiral smectic C phase has a phase sequence of at least an isotropic phase, a nematic phase, a smectic A phase, and the smectic C phase from a high-temperature side or a phase sequence of at least an isotropic phase, a nematic phase, and the smectic C phase from the high-temperature side.

7. The liquid crystal light modulator according to claim 1, further comprising an optical phase compensation film.

* * * * *